(12) United States Patent
Simca

(10) Patent No.: US 10,110,600 B1
(45) Date of Patent: Oct. 23, 2018

(54) DYNAMICALLY LEARNING AND SECURING AN ASSET-TO-ASSET CLOUD COMMUNICATION ENVIRONMENT

(71) Applicant: CyberArk Software Ltd., Petach-Tikva (IL)

(72) Inventor: Dor Simca, Oranit (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/889,141

(22) Filed: Feb. 5, 2018

Related U.S. Application Data

(63) Continuation-in-part of application No. 15/649,263, filed on Jul. 13, 2017, now Pat. No. 9,971,884.

(51) Int. Cl.
*G06F 7/04* (2006.01)
*H04L 29/06* (2006.01)
*G06N 99/00* (2010.01)

(52) U.S. Cl.
CPC ....... *H04L 63/0876* (2013.01); *G06N 99/005* (2013.01); *H04L 63/10* (2013.01); *H04L 63/20* (2013.01)

(58) Field of Classification Search
None
See application file for complete search history.

(56) References Cited

U.S. PATENT DOCUMENTS

2012/0266231 A1\* 10/2012 Spiers ................. H04L 63/0218 726/12
2015/0312233 A1   10/2015 Graham et al.

\* cited by examiner

*Primary Examiner* — Brandon S Hoffman
(74) *Attorney, Agent, or Firm* — Finnegan, Henderson, Farabow, Garrett & Dunner, LLP

(57) ABSTRACT

The disclosed embodiments include systems and methods for dynamically investigating a changing asset-to-asset cloud communication environment. The disclosed embodiments may involve creating a baseline context for a trusted server, the baseline context including categories of assets in the changing asset-to-asset cloud communication environment and corresponding access rights for the categories of assets, training the baseline context for the trusted server based on automatically discovered access rights, and operating the trained baseline context for the trusted server.

24 Claims, 13 Drawing Sheets

DYNAMICALLY LEARNING AND SECURING AN ASSET-TO-ASSET CLOUD COMMUNICATION ENVIRONMENT

CROSS-REFERENCE TO RELATED APPLICATION

The present application is a continuation-in-part of U.S. application Ser. No. 15/649,263, now U.S. Pat. No. 9,971,884, issued May 15, 2018, titled "Providing Credentials in an Automated Machine-to-Machine Communication System Environment" and filed on Jul. 13, 2017, the entire disclosure of which is hereby incorporated by reference.

BACKGROUND

Cloud-based computing has become increasingly prevalent for enterprises. One important aspect of cloud-computing is scalability. By being able to provision new cloud resources on demand, and essentially in real-time, enterprises can achieve the cloud-computing benefits that they need and cloud providers can allocate their cloud resources as needed.

In a cloud environment, new assets may be provisioned (or spun up) rapidly, while other assets are discontinued. Assets may include cloud resources such as servers, databases, virtual machines having independent operating systems, containers sharing a common operating system kernel, serverless code segments, and more. In some environments, enterprises may provision numerous instances of the same asset in order to meet demand (e.g., provision hundreds of servers to accommodate anticipated demand from clients). Further, with the growing popularity of continuous delivery and continuous deployment software development practices, cloud assets may be automatically provisioned by enterprises once software has been tested or otherwise readied for deployment. Assets also may be deployed to perform the testing.

Although rapid provisioning of cloud assets can enable efficiencies for enterprises and cloud providers, it also poses security risks. Generally, when a new cloud asset is provisioned, it does not necessarily have the ability to communicate with other cloud assets. In particular, many cloud assets have security requirements that limit access to them, such as database passwords, secret API keys, per-user encryption keys, and other types of secrets. Such secrets must be secured and managed so that access to them is limited to users and applications that need them and are allowed to use them.

Existing security techniques include individually providing secrets or other credentials to individual cloud assets in order for them to communicate with other assets. Other approaches include providing initial secrets or credentials that are hard-coded into the system environment (e.g., in configuration files of cloud assets). Similarly, secrets or credentials may be written into the code of a new cloud asset when it is provisioned. Nevertheless, these approaches provide inadequate security, especially in dynamic cloud environments with rapidly changing deployments of cloud assets. For example, if a secret or credential is included in a file that is used by a cloud asset (e.g., an SSH key or encryption private key), it may be transmitted from asset to asset, thereby exposing it to possible interception or eavesdropping, and possibly contravening industry standards or government regulations (e.g., in defense or healthcare environments). Moreover, such secrets or credentials may be left in place for prolonged periods of time, thus exacerbating these security threats. These techniques are also inefficient, time-consuming, and resource-intensive.

A further security technique involves encrypting the data in a configuration file of a cloud asset, and then checking the code of the asset into a code repository. This is also problematic, however, because sharing the encryption key for the encrypted data is difficult. Further, even if the encryption key could be shared securely, a further problem arises: the requirements that cause secrets and other credentials to change are not necessarily synchronized with checking code into the code repository. For example, code developers may check code into a repository on an ad hoc basis, while requirements may dictate changing the secret or other credential at different times (e.g., upon detecting that an account was compromised, an auto-rotate policy for passwords, a shift to a new infrastructure provider or a new infrastructure, etc.). This can result in secrets or credentials for cloud assets being out-of-date and ineffective for actually achieving secure communications with other assets.

Thus, there is a need for technological solutions for securing a changing asset-to-asset cloud communication environment, where investigation and learning operations are performed dynamically. As disclosed herein, this security can be automatically provided without the need for predefined secrets or credentials given to each cloud asset or process. Instead, based on a dynamic investigation of a cloud asset or process and dynamic learning process, a determination can be made whether the cloud asset should be able to communicate with another asset in a changing environment or whether the process should be permitted. A trusted source may be configured to determine whether to validate or authorize the cloud asset to communicate with the other asset.

SUMMARY

The disclosed embodiments describe systems and methods for dynamically investigating a changing asset-to-asset cloud communication environment. For example, a non-transitory computer readable medium may include instructions that, when executed by at least one processor, cause the at least one processor to perform operations comprising create a baseline context for a trusted server, the baseline context including a plurality of categories of assets in the changing asset-to-asset cloud communication environment and a corresponding plurality of access rights for the plurality of categories of assets; train the baseline context for the trusted server based on automatically discovered access rights, wherein the automatically discovered access rights are dynamically discovered, and the training includes adding rules to the baseline context based on observing activity of a plurality of assets corresponding to the plurality of categories of assets; and operate the trained baseline context for the trusted server to: identify an asset spun up in the changing asset-to-asset cloud communication environment based on a notification identifying the spun up asset; determine that the spun up asset will require authentication to achieve at least some secure communication functionality in the changing asset-to-asset cloud communication environment; and automatically authenticate the spun up asset based on the trained baseline context for the trusted server.

According to a disclosed embodiment, the operations further comprise automatically determine, based on the authentication, whether the spun up asset is authorized to perform the secure communication functionality in the changing asset-to-asset cloud communication environment.

According to a disclosed embodiment, the operations further comprise determining a version of the automatically discovered access rights and confirming whether it is the most recent version.

According to a disclosed embodiment, the trusted server and spun up asset are in a common system environment within the changing asset-to-asset cloud communication environment.

According to a disclosed embodiment, the trusted server and spun up asset are in different system environments within the changing asset-to-asset cloud communication environment.

According to a disclosed embodiment, the trained baseline context for the trusted server includes a first rule that a first one of the access rights may not be changed and second rule that a second one of the access rights may be changed within a defined threshold of variance.

According to a disclosed embodiment, the operations further comprise: determine that the spun up asset is a potential anomaly according to the trained baseline context; enable a trusted identity to confirm that the spun up asset is authorized to perform the secure communication functionality in the changing asset-to-asset cloud communication environment; and update the trained baseline context based on a confirmation from the trusted identity that the spun up asset is authorized to perform the secure communication functionality.

According to a disclosed embodiment, the trusted identity is provided with a prompt identifying the spun up asset being a potential anomaly according to the trained baseline context.

According to a disclosed embodiment, the trained baseline context is created in a manner transparent to the spun up asset.

According to a disclosed embodiment, the automatically discovered access rights are further discovered based on information identifying a cloud orchestration tool that created the spun up asset.

According to a disclosed embodiment, the automatically discovered access rights are further discovered based on the workflow process by which the spun up asset was created.

According to a disclosed embodiment, the automatically discovered access rights are further discovered based on time information associated with the creation of the spun up asset.

According to a disclosed embodiment, the automatically discovered access rights are further discovered based on a dynamically determined load level of a portion of the changing asset-to-asset cloud communication environment.

According to a disclosed embodiment, the automatically discovered access rights are further discovered based on observing patterns of communications activity among different assets in the changing asset-to-asset cloud communication environment.

A disclosed embodiment may also include a computer-implemented method, executable by a processor of a computing system, for dynamically investigating a changing asset-to-asset cloud communication environment. The method may comprise creating a baseline context for a trusted server, the baseline context including a plurality of categories of assets in the changing asset-to-asset cloud communication environment and a corresponding plurality of access rights for the plurality of categories of assets; training the baseline context for the trusted server based on automatically discovered access rights, wherein the automatically discovered access rights are dynamically discovered, and the training includes adding rules to the baseline context based on observing activity of a plurality of assets corresponding to the plurality of categories of assets; and operating the trained baseline context for the trusted server to perform steps of: identifying an asset spun up in the changing asset-to-asset cloud communication environment based on a notification identifying the spun up asset; determining that the spun up asset will require authentication to achieve at least some secure communication functionality in the changing asset-to-asset cloud communication environment; automatically authenticating the spun up asset based on the trained baseline context for the trusted server; and automatically determining, based on the authentication, whether the spun up asset is authorized to perform the secure communication functionality in the changing asset-to-asset cloud communication environment.

According to a disclosed embodiment, the trained baseline context for the trusted server is configured to have a maintenance mode, during which at least some of the manually defined access rights and automatically discovered access rights are overridden by changes to access rights.

According to another disclosed embodiment, the trained baseline context for the trusted server is configured to have a new asset creation mode, during which at least some of the manually defined access rights and automatically discovered access rights are overridden by changes to access rights.

According to another disclosed embodiment, the method further comprises providing a credential to the spun up asset for use in performing the secure communication functionality in the changing asset-to-asset cloud communication environment.

According to further embodiments, the method further comprises generating a credential that is not provided to the spun up asset, but is used on behalf of the spun up asset, in performing the secure communication functionality in the changing asset-to-asset cloud communication environment.

According to additional disclosed embodiments, the observed communications activity of the plurality of assets corresponding to the plurality of categories of assets is obtained from micro agents running on the plurality of assets.

According to further disclosed embodiments, the micro agents run transparently to users of the plurality of assets.

According to additional embodiments, the micro agents run transparently to operating systems of the plurality of assets.

According to additional embodiments, the micro agents are configured to report ongoing communications activity of the plurality of assets to the trusted server.

According to additional embodiments, the micro agents are injected into the plurality of assets as part of a process by which the plurality of assets were spun up.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
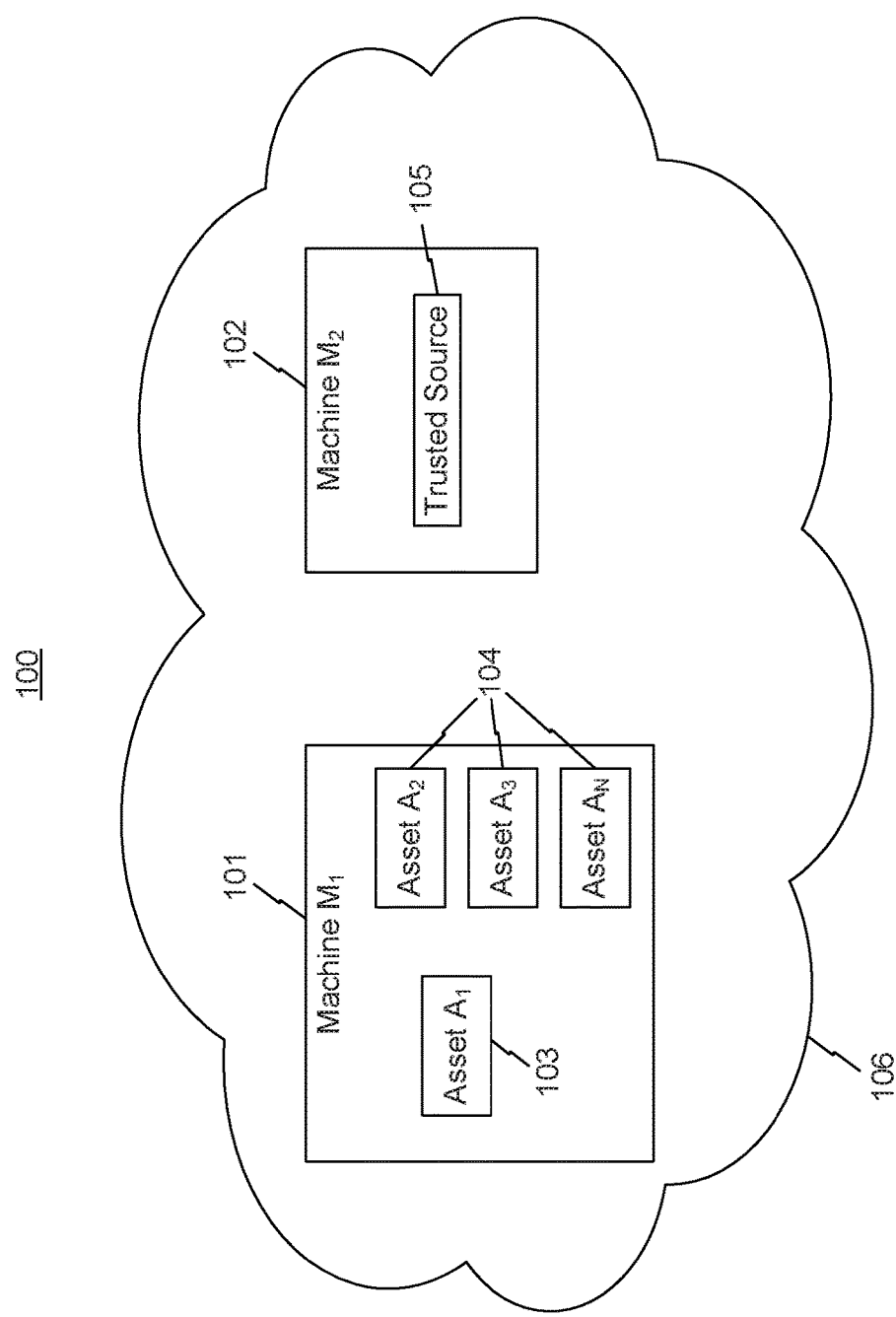
FIG. 1 is a block diagram of an example system, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The disclosed embodiments include systems and methods for securing an asset-to-asset cloud communication environment. As disclosed herein, an asset in a cloud communication environment may be newly spun up or preexisting. Examples of assets include servers, databases, virtual machines having independent operating systems, containers sharing a common operating system, serverless code segments, applications, versions of applications, or other software components, and more. In order for assets to engage in asset-to-asset communication, they may be located in the same cloud communication environment, or in different cloud communication environments. In addition, an asset within a cloud communication environment may communicate with an asset in a non-cloud environment. Further, assets engaging in asset-to-asset communication may be located in the same physical machine (e.g., in a virtualized container environment) or in different physical machines.

In the disclosed embodiments, cloud communication environments may be public, private, or a combination of public and private. Examples of cloud communication environments include those offered by Microsoft Azure™, Hewlett Packard Enterprise Rapid Infrastructure Provisioning™, IBM Bluemix™, Amazon Web Services™, and others. Cloud communications may be deployed in one or more service configurations, such as IaaS (Infrastructure-as-a-Service or Information-as-a-Service), PaaS (Platform-as-a-Service or Process-as-a-Service), SaaS (Software-as-a-Service or Storage-as-a-Service), DaaS (Database-as-a-Service), AssS (Application-as-a-Service), etc. In some embodiments, cloud communication environments may be changing or dynamic in nature (e.g., because of assets being spun up or down, rights or privileges of assets changing, credentials or account information of assets changing, network resources in the environment changing, new versions of applications being installed on resources, new flows or processes between assets, etc.).

As disclosed herein, secure communication functionality broadly refers to the use of a security feature in enabling, or facilitating, communications between different assets. The secure communication functionality may be based on a secure communications protocol (e.g., IPSec, SHTTP, SSL, TLS, PPTP, L2TP, etc.) between assets, a security requirement (e.g., tokens, SSH keys, Kerberos authentication, etc.) for accessing an asset, or a combination of the two.

In the disclosed embodiments, newly spun up or identified cloud assets or a user identity associated with a cloud asset may be automatically authenticated. As described herein, the authentication may broadly take several forms, such as verification of passwords, SSH keys, symmetric (e.g., public/private) keys, Kerberos tickets, Docker signed tags, and other types of cryptographic data or privileged access tokens. Further, the authentication may be based on information associated with a user identity, such as biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication).

The present disclosure also describes techniques for providing credentials to spun up assets, either directly or indirectly. Credentials may be a variety of different types of security information or a security requirement that is needed for one asset to engage in secure communications with another asset. Examples of credentials are passwords, SSH keys, symmetric (e.g., public/private) keys, and other types of cryptographic data or privileged access tokens. As discussed further below, credentials may be provided to (e.g., stored in or on the same machine as) assets, or stored in secure credential management systems (e.g., credential vaults).

According to disclosed embodiments, a baseline context for a trusted server may be created, trained, and operated to dynamically investigate a changing asset-to-asset cloud communication environment. The baseline context, as referred to herein, may be a set of rules or access rights defining how assets may communicate in the cloud communication environment, which are based on observations of various types of characteristics or parameters of the assets in the environment. As discussed further below, the characteristics or parameters may take a wide variety of forms, and examples include an asset's IP address, MAC address, host name, involvement with orchestration tools or specific orchestration parameters (e.g., using an API, service account, container source, etc.), involvement in a development pipeline (e.g., how the image or docker was created, the creator user, container labels, etc.), time of requesting access to another resource (e.g., whether or not during regular work hours), time of requesting access to another resource in view of an exception (e.g., system maintenance) schedule, environment parameters (e.g., current load on the asset or target resource, load on other parts of the environment, topology changes, etc.), applicative monitoring system (e.g., which may be specific for each asset, account, user, etc.), and various other parameters. In some embodiments, the baseline context may be manually or automatically trained, as discussed further below.

Reference will now be made in detail to the disclosed embodiments, examples of which are illustrated in the accompanying drawings.

FIG. 1 is a block diagram of an example system 100 in accordance with disclosed embodiments. In the system 100 of FIG. 1, Machine $M_1$ 101 may be a physical machine or virtual machine running in a cloud communication environment 106. Similarly, Machine $M_2$ 102 may be a physical machine or virtual machine running in a cloud communication environment 106. In various embodiments, Machine $M_1$ 101 and Machine $M_2$ 102 may be virtual machines running on common hardware, and in other embodiments Machine $M_1$ 101 and Machine $M_2$ 102 may run on separate hardware. Although Machine $M_1$ 101 and Machine $M_2$ 102 are depicted in the same cloud communication environment 106 in FIG. 1, in additional embodiments they may be deployed in separate cloud communication environments. Further, Machine $M_1$ 101 may be deployed in cloud communication environment 106 while Machine $M_2$ 102 may be deployed in a non-cloud environment. As discussed further below, Machine $M_1$ 101 may need authorization in order to communicate with assets on Machine $M_2$ 102, or with other assets on other machines not depicted in FIG. 1.

In some embodiments, Machine $M_1$ 101 may run one or more assets, such as Asset $A_1$ 103 and Assets $A_2, A_3 \ldots A_N$ 104. As discussed above, assets 103/104 may be a wide variety of cloud based resources, such as servers, databases, virtual machines, containers, serverless code segments, etc. In accordance with FIG. 1, Asset $A_1$ 103 may represent a newly spun up asset, whereas Assets $A_2, A_3 \ldots A_N$ 104 may represent preexisting or persistent assets. As discussed further below, in some embodiments Asset $A_1$ 103 may be identified as needing authorization to achieve at least some secure communication functionality with a different asset in the cloud communication environment 106 (e.g., secure communication functionality with Assets $A_2, A_3 \ldots A_N$ 104, or with other assets in other cloud or non-cloud communication environments).

Asset $A_1$ 103 may be newly spun up or newly identified. For example, in a continuous delivery or continuous deployment process, new code may be written and spun up in one or more assets in cloud communication environment 106. Further, in a situation where several instances of the same code are intended to be deployed in cloud communication environment 106, one or more assets may be spun up to run the code in each of the instances. Still further, Asset $A_1$ 103 may be automatically spun up by another application operating in the cloud communication environment 106. In some embodiments, Asset $A_1$ 103 may be newly identified, but not necessarily newly spun up. For a variety of reasons, there may be a passage of time between the spinning up of Asset $A_1$ 103 and its identification. As discussed further below, there are a variety of techniques for identifying Asset $A_1$ 103.

As depicted in FIG. 1, trusted source 105 may run on Machine $M_2$ 102. In other embodiments, as discussed further below, trusted source 105 runs on a different machine than Machine $M_2$ 102. Trusted source 105 is a trusted server (e.g., embodied as server software or hardware running server software) that serves to validate or authorize Asset $A_1$ 103 to communicate with one or more assets in the cloud communication environment 106. Trusted source 105 is trusted in the sense that, while Asset $A_1$ 103 may be unknown or untrusted when it is first spun up or identified, trusted source 105 is deemed a reliable source of validation or authorization information in the cloud communication environment 106. In some embodiments, access to trusted source 105 may be limited in order to preserve its reliability. For example, Asset $A_1$ 103 (and other assets) may lack the ability to read from or write data to trusted source 105. In further embodiments, trusted source 105 may be configured to investigate newly spun up or identified assets in the cloud communication environment 106, such as Asset $A_1$ 103, including in some embodiments according to a dynamic process with manual or active learning about the cloud communication environment. As discussed further below, trusted source 105 may perform this investigation directly (e.g., by information communicated to it from assets) or indirectly (e.g., through a micro agent installed on the asset, or based on data provided from a cloud vendor maintaining cloud communication environment 106). Thus, in the disclosed embodiments, assets may be investigated by a component external to a machine hosting the assets.

In some embodiments, trusted source 105 may maintain authorization policies, as discussed further below. These policies may be customizable, and may determine what assets (e.g., Asset $A_1$ 103) are authorized to securely communicate with other assets (e.g., Assets $A_2, A_3 \ldots A_N$ 104), and which assets (e.g., Asset $A_1$ 103) are authorized to obtain credentials to enable such secure communications. In some embodiments, trusted source 105 may maintain lists of authorized assets. For example, trusted source 105 may receive notifications of new, authenticated assets that are spun up and may add such assets to a list. Then, as discussed further below, trusted source 105 may consult the list when determining whether a newly spun up or identified asset is authorized and should receive a credential for secure communications.

Figure 2:
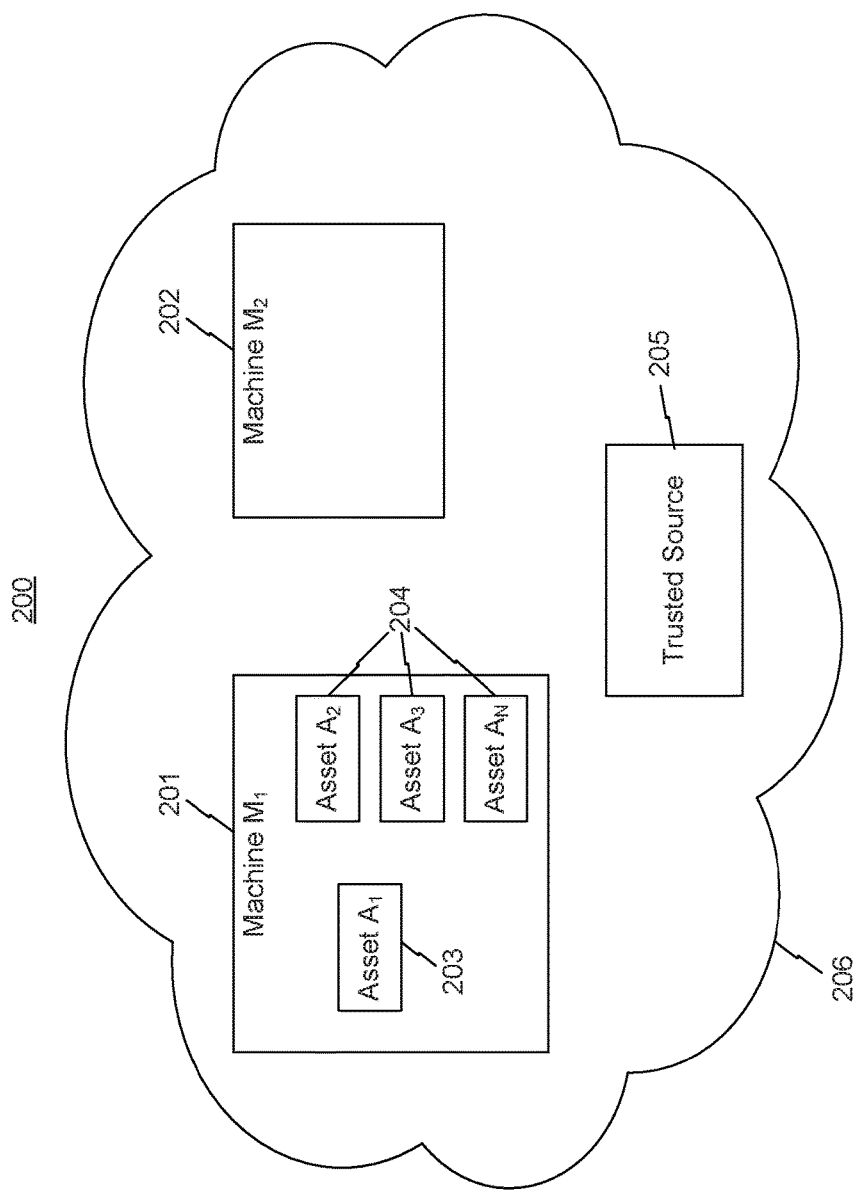
FIG. 2 is a block diagram of an example system, in accordance with further disclosed embodiments.

FIG. 2 is a block diagram of an example system 200 in accordance with disclosed embodiments. In the system 200 of FIG. 2, Machine $M_1$ 201 may be similar to Machine $M_1$ 101 described above in connection with FIG. 1. Machine $M_1$ 201 may be running assets, including Asset $A_1$ 203 and Assets $A_2 \ldots A_N$ 204, which may represent a variety of types of resources, devices, applications, or code segments, as discussed above. In some embodiments, Asset $A_1$ 203 may be a newly spun up or newly identified asset, whereas Assets $A_2 \ldots A_N$ 204 may be previously spun up or identified assets.

In contrast to FIG. 1, in FIG. 2 Machine $M_2$ 202 is deployed separate from trusted source 205. As depicted in FIG. 2, trusted source 205 may be a server running in communication environment 206. In such a configuration, trusted source 205 may be configured to investigate, either directly or indirectly, Asset $A_1$ 203 and Assets $A_2 \ldots A_N$ 204 on Machine $M_1$ 201, as discussed above. Trusted source 205 may use that information to determine whether to validate or authorize Asset $A_1$ 203 to communicate with one or more other assets in communication environment 206, or in other communication environments. Although depicted as a part of communication environment 206, in some embodiments trusted source 205 may be deployed in a separate communications environment. As an example, if communication environment 206 is a cloud communications environment (e.g., public, private, or a combination of both), trusted source 205 may be deployed either in that same cloud communications environment or in a different communications environment, which may be a cloud or non-cloud environment. In some embodiments, for example, enterprises may host trusted source 205 locally on their premises. In other embodiments, trusted source 205 may be operated by a third-party cybersecurity provider.

Figure 3:
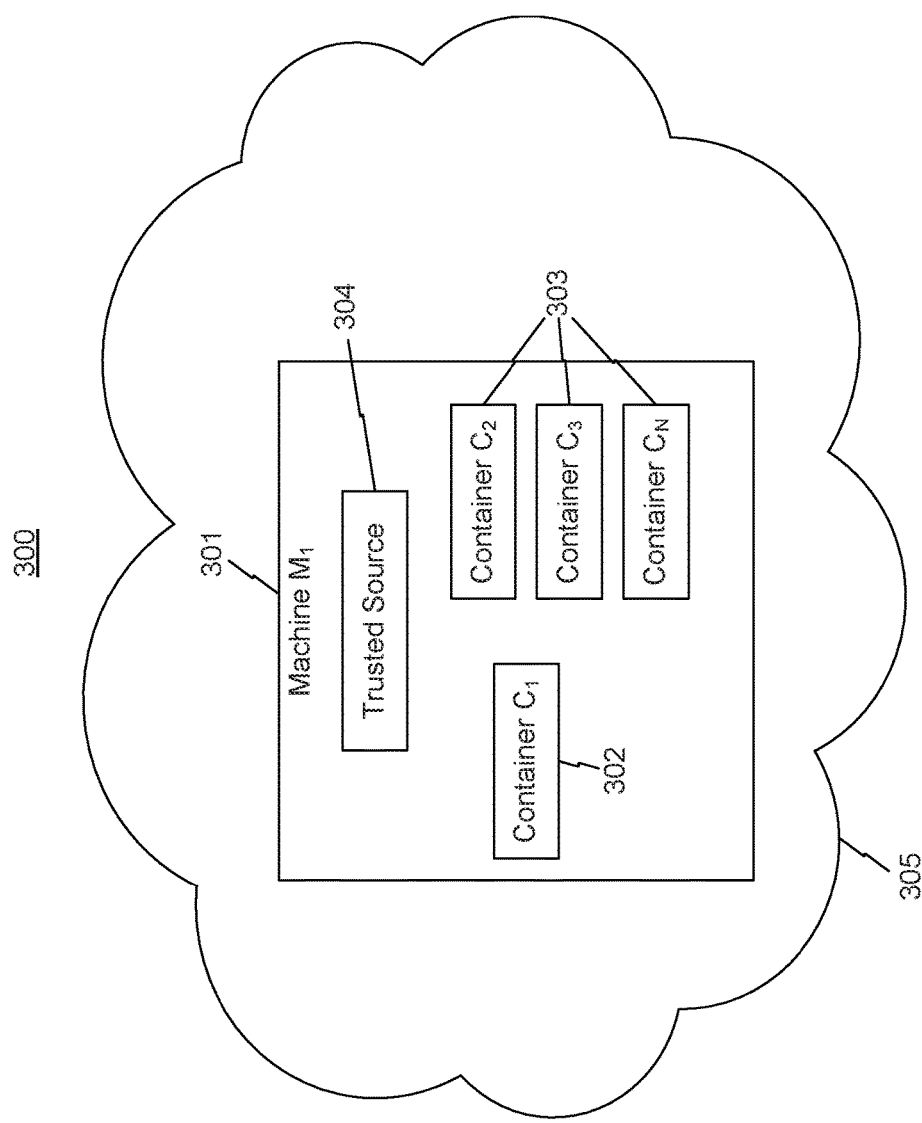
FIG. 3 is a block diagram of an example system, in accordance with additional disclosed embodiments.

FIG. 3 is a block diagram of an example system 300 in accordance with disclosed embodiments. In the system 300 of FIG. 3, Machine $M_1$ 301 may be similar to Machine $M_1$ 101 in FIG. 1 and Machine $M_1$ 201 in FIG. 2, except that Machine $M_1$ 301 is configured to host both container assets (e.g., Container $C_1$ 302 and Containers $C_2 \ldots C_N$ 303) and trusted source 304. In this configuration, Container $C_1$ 302 may be a newly spun up or newly identified container, and Containers $C_2 \ldots C_N$ 303 may be preexisting or previously identified containers. Trusted source 304 may be configured to investigate, directly or indirectly, assets such as Container $C_1$ 302 and Containers $C_2 \ldots C_N$ 303 in accordance with the description above of trusted source 105 and trusted source 205. For example, in some embodiments, an asset such as Container $C_1$ 302 may be investigated from a location external to Machine $M_1$ 301 hosting the container. Further, as discussed below, the investigation may be dynamic and involve manual or automatic learning of the cloud environment.

In the configuration shown in FIG. 3, because the trusted source 304 is located on the same machine 301 as the container being investigated (e.g., Container $C_1$ 302), the trusted source 304 may have better access, or different types of access, to information in its investigation of the asset. As an example, trusted source 304 may be able to intercept communications to or from Container $C_1$ 302, or Container $C_1$ 302 may be configured so that upon being spun up it automatically communicates with trusted source 304. Further, in some embodiments trusted source 304 may have access to information related to the creation of assets on Machine $M_1$ 301 (e.g., information from a cloud service provider message queuing service), which may identify new containers being spun up or spun down on Machine $M_1$ 301. As discussed further below, this information may also facilitate trusted source 304 in its validation or authorization of Container $C_1$ 302 to communicate with one or more other containers in communication environment 305 (or in other communication environments).

Figure 4:
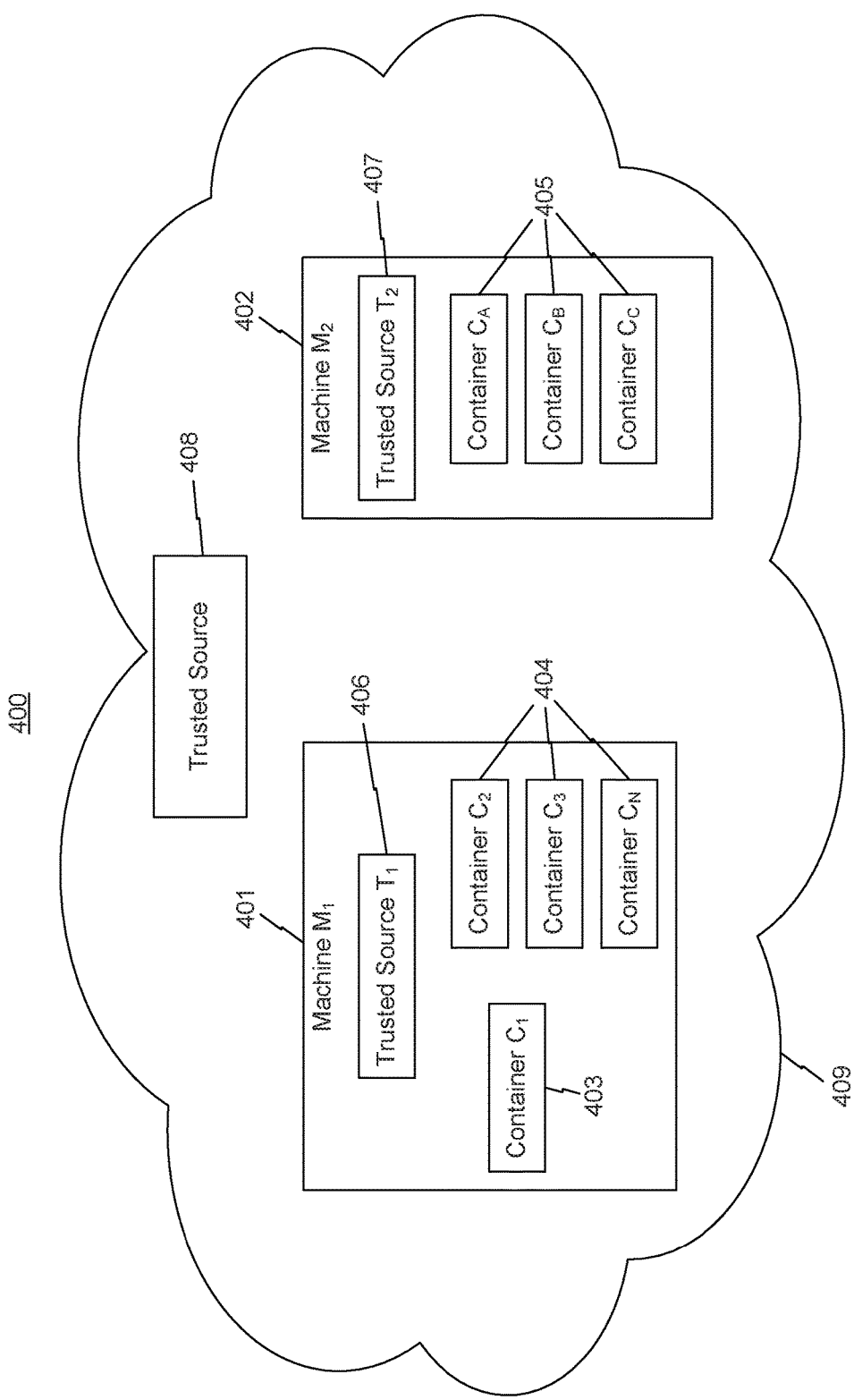
FIG. 4 is a block diagram of an example system, in accordance with further disclosed embodiments.

FIG. 4 is a block diagram of an example system 400 in accordance with disclosed embodiments. In the system 400 of FIG. 4, Machine $M_1$ 401 may host a plurality of container assets, such as Container $C_1$ 403 and Containers $C_2 \ldots C_N$ 404. Similar to the above discussion, Container $C_1$ 403 may be a newly spun up or newly identified container asset, and Containers $C_2 \ldots C_N$ 404 may be preexisting or previously identified container assets. Machine $M_2$ 402 may also contain a plurality of container assets, such as Containers $C_A \ldots C_C$ 405. In contrast to systems 100, 200, and 300, as discussed above, system 400 involves a Trusted Source $T_1$ 406 being deployed in Machine $M_1$ 401 and Trusted Source $T_2$ 407 being deployed in Machine $M_2$ 402. In this manner, Trusted Source $T_1$ 406 may be configured to investigate container assets hosted by Machine $M_1$ 401, while Trusted Source $T_2$ 407 may be configured to investigate container assets hosted by Machine $M_2$ 402. In some embodiments, Trusted Source $T_1$ 406 and Trusted Source $T_2$ 407 may both interoperate with a central trusted source 408. For example, in certain embodiments, Trusted Source $T_1$ 406 and Trusted Source $T_2$ 407 may perform investigations of container assets on their respective machines $M_1$ and $M_2$, but may rely on trusted source 408 to make determinations as to whether container assets should be validated or authorized to communicate with other assets. In further embodiments, Trusted Source $T_1$ 406 and Trusted Source $T_2$ 407 may operate independently of trusted source 408 to each investigate their container assets on their respective machines $M_1$ and $M_2$. For example, if Container $C_1$ 403 is to communicate with Container $C_B$ 405, Trusted Source $T_1$ 406 may function to validate or authorize Container $C_1$ 403 and Trusted Source $T_2$ 407 may function to validate or authorize Container $C_B$ 405. In some embodiments, the outputs of Trusted Source $T_1$ 406 and Trusted Source $T_2$ 407 may be fed to trusted source 408 for a decision as to whether to validate or authorize Container $C_1$ 403 to communicate with another container.

Figure 5:
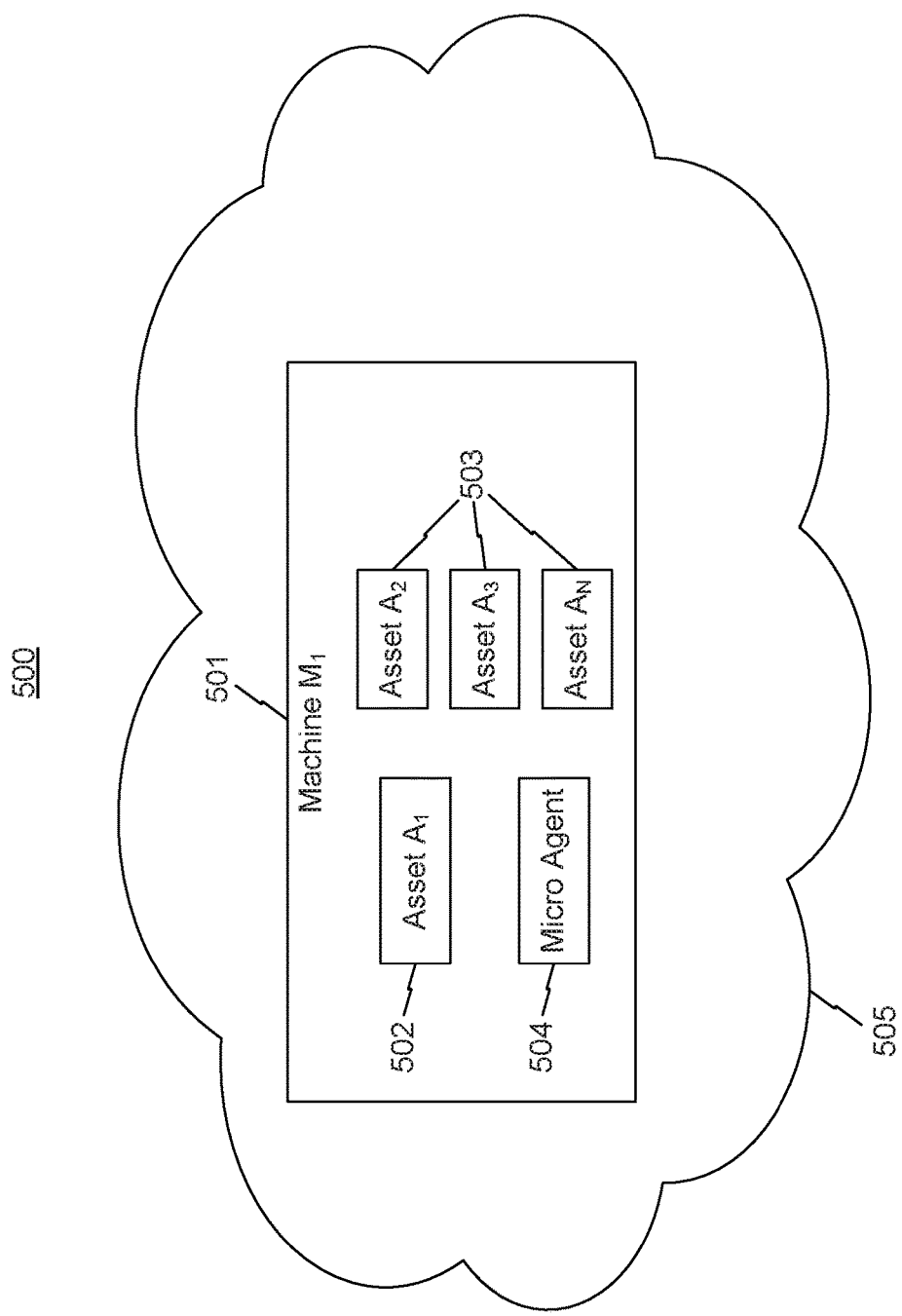
FIG. 5 is a block diagram of an example system, in accordance with additional disclosed embodiments.

FIG. 5 is a block diagram of an example system 500 in accordance with disclosed embodiments. In the system 500 of FIG. 5, Machine $M_1$ 501 may be similar to Machine $M_1$ 101, 201, 301, or 401, as described above. Machine $M_1$ 501 may deploy assets such as Asset $A_1$ 502 and Assets $A_2 \ldots A_N$ 503. In addition, Machine $M_1$ 501 may deploy a micro agent 504. In some embodiments, micro agent 504 may be injected or installed on Machine $M_1$ 501, but separate from Asset $A_1$ 502. In other embodiments, micro agent 504 may be injected or installed on Asset $A_1$ 502 itself. In other embodiments, micro agent 504 may be provided external to Machine $M_1$ 501. Micro agent 504 may be an executable program or set of code segments configured to investigate Asset $A_1$ 502 and send information about Asset $A_1$ 502 to a trusted source, such as trusted source 105, 205, 304, 406, 407, or 408, as discussed above. For example, micro agent 504 may be configured to monitor or intercept communications to and from Asset $A_1$ 502. Micro agent 504 may also be configured to receive information about the creation of Asset $A_1$ 502, such as information from a cloud environment message queuing service. In some embodiments, micro agent 504 may run transparently to Machine $M_1$ 501, transparently to Asset $A_1$ 502, and/or transparently to an operating system running Asset $A_1$ 502. In further embodiments, micro agent 504 may be configured to investigate not only Asset $A_1$ 502, but also investigate Assets $A_2 \ldots A_N$ 503. In some embodiments, micro agent 504 may investigate Assets $A_1$ 502 and Assets $A_2 \ldots A_N$ 503 from outside of Machine $M_1$ 501. As discussed above, the results of the investigation may be sent to a trusted source, such as trusted source 105, 205, 304, 406, 407, or 408.

Figure 6:
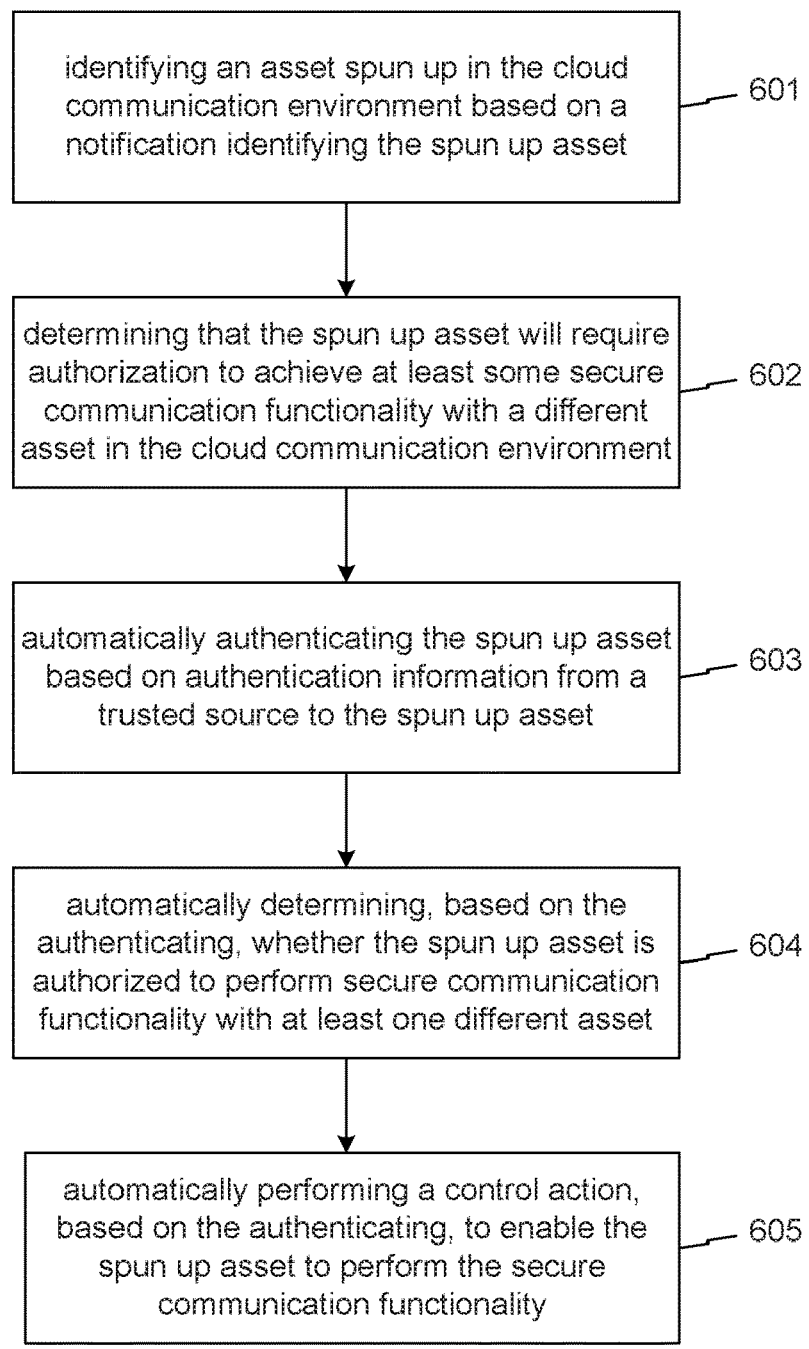
FIG. 6 is a flow chart illustrating an example method for securing an asset-to-asset cloud communication environment.

FIG. 6 includes a flowchart illustrating an example process 600 for securing an asset-to-asset cloud communication environment. The cloud communication environment may be an environment as described above in connection with environments 106, 206, 305, 409, and 505. As discussed above, the cloud communication environment may be a public or private cloud environment, or a combination of both. Process 600 may be performed by one or more system components as described in systems 100, 200, 300, 400, and 500. For example, in some embodiments, process 600 may be performed by a trusted source, such as trusted sources 105, 205, 304, 406, 407, or 408, either functioning by themselves or together with other computer devices. In further embodiments, process 600 may be performed by a micro agent, such as micro agent 504, either operating by itself or with another computer device (e.g., a trusted source, such as trusted sources 105, 205, 304, 406, 407, or 408). As discussed further below, computer devices in systems 100, 200, 300, 400, and 500 may take a variety of forms, such as a computer program product or computer readable storage medium.

As part of operation 601, a computer device or system component may perform the operation of identifying an asset spun up in the cloud communication environment or identifying a new pattern of communications involving an asset. The asset or pattern may be identified based on a notification identifying the spun up asset or pattern. In some embodiments, the notification may be received by a trusted source (e.g., trusted sources 105, 205, 304, 406, 407, or 408), for example through an investigation process conducted by the trusted source. The notification may be received from the spun up asset itself or through an intermediary (e.g., a micro agent, such as micro agent 504). In further embodiments, the notification may be received by a computer device separate from a trusted source, but which is arranged for communications with the trusted source. For example, a service configured to monitor changes in a cloud environment may generate the notification. An example of such a service is Amazon CloudWatch Events™. Further, a cloud environment provider may generate the notification.

In some embodiments, the notification is obtained by monitoring the process by which an asset seeks to communicate with another asset, or the historical communications patterns of the asset. The monitoring may also focus on information associated with the creation of the asset. The monitoring may reveal information such as a process hash associated with a process to be performed by the asset, a process hash associated with the creation of the asset, a user identity or account associated with the asset, a signed tag in the asset (e.g., Docker tag), a process identification number associated with the asset, an instance identification number of the asset, a specific run or queue number of the asset, a network address (e.g., IP address or MAC address) associated with the asset, operating system information associated with the asset, cloud container information associated with the asset, serverless code information associated with the asset (e.g., a Lambda function using Amazon Web Services™ Lambda), etc. In some embodiments, the notification includes information relating to the type of the asset, such as an operating system type (e.g., Microsoft Windows Azure™, Google Chrome OS™, Linux, etc.) associated with the asset, a container type of the asset, a tag on the machine running the asset or on the asset itself (e.g., indicating that the asset is signed in accordance with a security protocol and can be trusted), an identification of the source or creator of the asset (e.g., the tool, platform, or orchestration software that spun up the asset), etc. Other information that may be included in the notification may be time information associated with the asset (e.g., creation or spin up time), the storage location of the asset, the destination of communications to be made by the asset, information describing the environment of the asset (e.g., the cloud communication environment), etc.

In some embodiments, the notification of a newly spun up asset or communications flow may be based on an automated process. For example, in a cloud environment where assets are being spun up, the assets may be programmed to immediately send a notification message to a trusted source, micro agent, or other computer device upon being spun up (or even before they are spun up). In further embodiments, the notification may be identified from a stream of system update data, such as that provided by Amazon CloudWatch Events™. Further, orchestrator software (e.g., Chef, Puppet, OpenStack, Juju, etc.) responsible for managing the spin up of cloud assets may automatically provide notifications of newly spun up cloud assets, or assets scheduled to be spun up. In addition, cloud environment message queuing services may provide automatic notifications of newly spun up assets, or assets scheduled to be spun up.

In process 600, as part of operation 602, a computer device or system component may further perform the operation of determining that the spun up asset will require authorization to achieve at least some secure communication functionality with a different asset in the cloud communication environment. Similarly, operation 602 may involve determining that a new communications flow involving an asset will require authorization to occur. For example, in some cloud communication environments, there may be rules that all asset-to-asset communications require authorization. In such environments, all newly spun up assets may be determined to require authorization to engage in communications with other assets. In further embodiments, a determination may be made whether a specific asset with which a newly spun up asset wishes to communicate has an authorization requirement. This may be based on the investigation processes described above. For example, a newly spun up asset may attempt to communicate with another asset, and through that attempted communication, a network address (e.g., IP address, MAC address, etc.) of the other asset may be identified. Based on this network address information, a computer device (e.g., trusted source, micro agent, or other computer device) may determine whether the spun up asset will need authorization to engage in the requested communications.

Further, even before the newly spun up asset attempts to communicate with another asset, it may be determined what other asset the newly spun up asset will attempt to communicate with in the future. This may be determined, for example, by examining the code, code comments, or metadata of the newly spun up asset. By examining this information, it may be determined that the newly spun up asset has a programmed function of attempting to communicate with another asset at a particular network address or through other specified techniques. Based on that information, a computer device (e.g., trusted source, micro agent, or other computer device) may determine that the newly spun up asset will in the future need authorization to communicate with the other asset.

In process 600, as part of operation 603, a computer device or system component may further perform the operation of automatically authenticating the spun up asset or communications flow. In some embodiments, authentication of the spun up asset may be based on the determination that the spun up asset requires authentication (e.g., the result of operation 602). The authentication may be based on authentication information from a trusted source to the spun up asset, and may include a privileged access credential or token, and biometric information, or behavioral information for authenticating a user identity, as discussed above. In different embodiments, the authentication may be initiated by the trusted source (e.g., when the trusted source identifies or receives a notification of a spun up asset), or may be based on a request to perform authentication that is received at the trusted source. The request to perform authentication may come from the spun up asset, a micro agent, or another computer device. In some embodiments, the authentication may be based on the same or similar information used to identify the spun up asset as described above with respect to operation 602. If the request to perform authentication is received from the asset, the request may also include information uniquely identifying the asset and/or information known only to the asset.

The authentication may be based on a variety of techniques. For example, as discussed above, numerous types of information about the spun up asset may be gathered based on the notification that is received or the investigation process, or received directly from the asset. In some embodiments, policies are maintained at a computer device (e.g., trusted source, micro agent, or other computer device) to determine whether the collected information satisfies an authentication requirement. This may involve comparing the gathered information about the spun up asset to corresponding authentication information at the trusted source. For example, if the investigation or notification reveals a process hash or user identity associated with the spun up asset, the process hash or user identity may be compared against authentication information at the trusted source that indicates authorized process hashes or user identities. If the spun up asset's process hash or user identity matches an authorized process hash or user identity, the spun up asset may be authenticated. If the spun up asset's process hash or user identity does not result in a match, authentication may be denied.

In situations where the spun up asset is authenticated, confirmation or other information of the authentication may be stored. For example, in a registry or database of active cloud assets, the spun up asset may be indicated as authenticated. On the other hand, in situations where the spun up asset is not authenticated, a similar registry or database may be updated to indicate that authentication has failed. Further, the fact that authentication has failed may be used to trigger other actions, such as spinning down the asset, disabling the asset, quarantining the asset from other assets, updating a password or credential vault to disable a password or credential associated with the asset, etc. In some embodiments, the authentication process may be performed as part of an audit or compliance mechanism for approving or denying assets meeting one or more compliance policies. In such embodiments, responsive to denying an asset, a security alert may be triggered indicative of a security breach or a vulnerability associated with the asset, for example.

In process 600, as part of operation 604, a computer device or system component may further perform the operation of automatically determining, based on the authenticating, whether the spun up asset is authorized to perform secure communication functionality with at least one different asset. Similarly, operation 604 may involve determining that a new communications flow involving an asset is authorized. In some embodiments, once an asset is authenticated, the policies may be applied to determine if the asset should be able to securely communicate with another asset. As discussed above, the secure communication functionality may be based on a secure communication protocol (e.g., IPSec, SHTTP, SSL, TLS, PPTP, L2TP, etc.) between assets, a security requirement (e.g., tokens, SSH keys, Kerberos authentication, etc.) for accessing an asset, or a combination of the two.

For example, in some embodiments a policy may govern asset-to-asset communications capabilities. Policies may limit asset-to-asset communications only between specific pre-approved assets, based on categories or classifications of pre-approved assets or asset types, or in any other way that enterprises may choose to customize asset communications capabilities. Policies may, for example, govern time periods during which assets may be able to obtain authorization for performing secure communication functionality with other assets. For example, a time limit may apply such that within a specific time period after spin up, an authenticated asset may be able to obtain authorization, but after the time period such authorization may be denied. Policies may also be configured to allow authorization for certain types of communications (e.g., to perform specific asset tasks) by an asset. In further embodiments, some policies may provide that any asset that is successfully authenticated is authorized to perform secure communication functionality with another asset. Further, in some embodiments the policy may involve a second layer or additional layers (e.g., 'n' layers) of authentication. For example, for assets that are successfully authenticated (e.g., in operation 603), a second (or additional 'n') authentication process(es) may take place. This second authentication may be based on similar types of information as the first authentication, or different techniques (e.g., secure tokens, passwords, key exchange, etc.). If this second authentication is used, it may determine whether the asset is authorized to perform secure communication functionality with at least one different asset.

In process 600, as part of operation 605, a computer device or system component may further perform the operation of automatically performing a control action, based on the authenticating, to enable the spun up asset to perform the secure communication functionality. Similarly, operation 605 may involve automatically performing a control action to enable a new communications flow involving the asset to occur.

One example of performing the control action is providing a credential to the spun up asset for use in secure communication functionality with a different asset. The credential may be, for example, a password, SSH key, asymmetric (e.g., public/private) key, symmetric key, ticket, signed tag, or other types of cryptographic data. The credential provided to the asset may be a predetermined and securely stored credential or may be dynamically generated. Such credentials received by the asset may be stored in the asset itself (e.g., as metadata), on the machine running the asset, or in other ways. In some embodiments, a credential will be provided to the asset that is identical or similar to credentials given to other assets for securely communicating with the different asset. In other embodiments, the credential is unique to the spun up asset, and no other assets will obtain an identical or similar credential. For example, such a unique credential may include an identifier associated with the spun up asset that indicates the asset's identification number, spin up date and time, container identification number, associated user account, associated operating system, etc. Depending on the embodiment, the credential may be for unlimited use by the spun up asset, for a restricted use (e.g., certain number of times, or certain duration), or for temporary or one-time use.

As an alternative to directly providing the credential to the spun up asset, in some embodiments the credential may be indirectly provided. For example, the credential may be stored in a secure credential system (e.g., secure credential vault) or other accessible system that intermediates secure access between the spun up asset and the other asset to which it desires to communicate. In this manner, the spun up asset may be able to communicate with the vault, which will then present the credential to the other asset, without requiring that the credential actually be stored on (or known to) the spun up asset or the machine running it.

In further embodiments, the control action may include linking a credential of the spun up asset with a credential in a secure credential system (e.g., secure credential vault). For example, if a spun up asset has a credential already, which may be stored in the asset or on the machine running the asset, a vault may be updated so that it is linked to that credential. The vault may thus be able to determine that, if that credential is received, the vault can provide a different (e.g., secret) credential to another asset as needed for secure communications with the spun up asset. Other forms of linking are possible too. For example, if a spun up asset has a credential, modifications may be made to the asset with which it desires to securely communicate (e.g., updating a white-list or other type of registry of authorized credentials).

In additional embodiments, the control action may involve connecting to the target asset with which a newly spun up or identified asset wishes to communicate, and altering access permissions on the target asset. This may involve, for example, creating a new account on the target asset, modifying an existing account on the target asset, or modifying access permissions stored in a separate computer device (e.g., updating permissions in an LDAP database).

In some embodiments, operations 603, 604, or 605 may also involve rotating passwords or other credentials associated with the spun up asset. For example, if an asset includes an initial password or other credential upon being spun up (e.g., hard-coded credential), and is then authenticated and determined to be authorized to perform secure communication functionality with another asset, a new password or other credential may be provided, as discussed above. In connection with providing this new password or other credential, the initial password or credential may be rotated, cancelled, deleted, or otherwise rendered ineffective for the asset to use in performing secure communication functionality with the other asset. For example, in situations where passwords or other credentials are maintained in a secure vault, as discussed below in connection with FIG. 8, the initial password or credential may be rendered ineffective for accessing the vault, or a preexisting password or credential in the vault may be replaced with the new password or credential.

Figure 7:
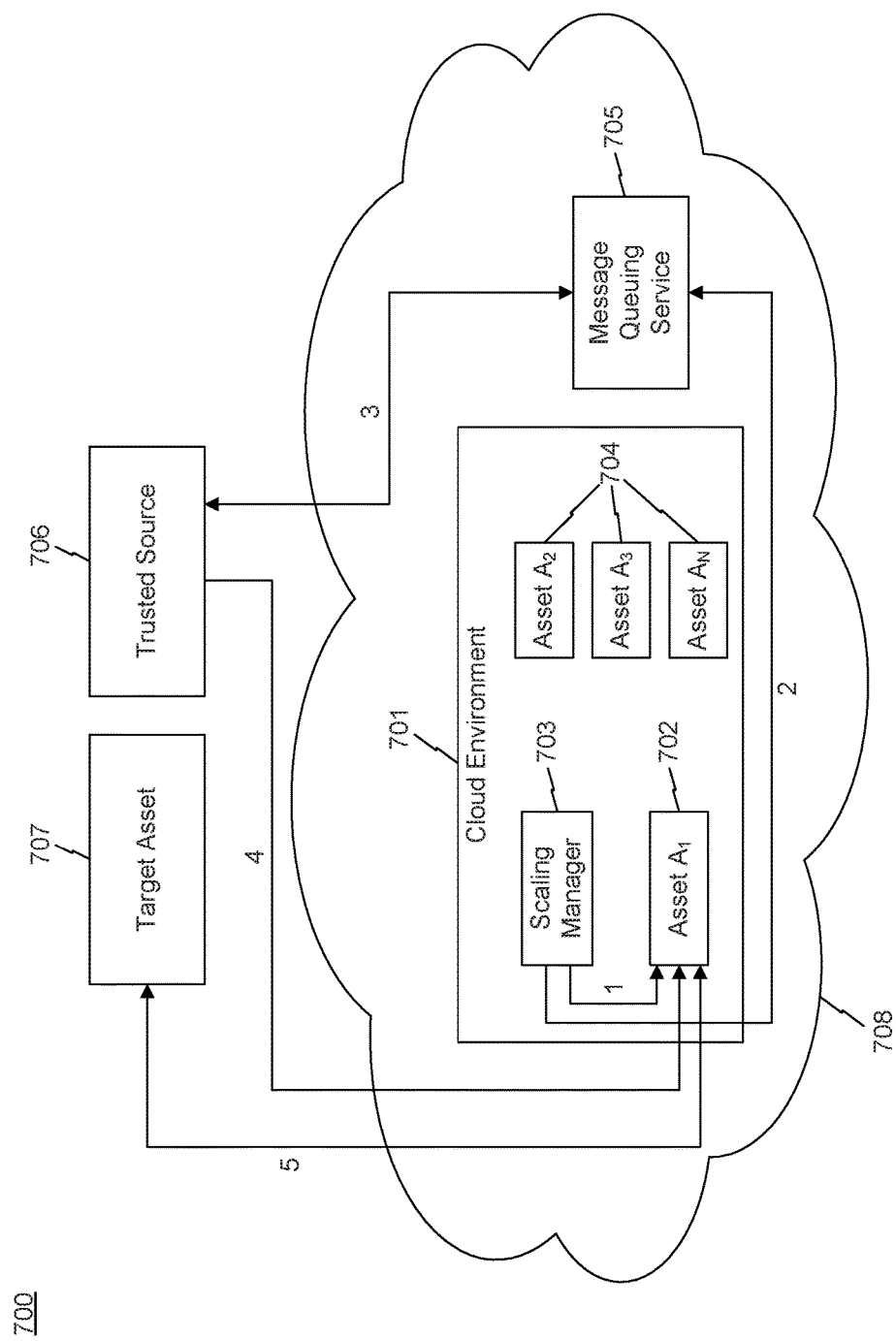
FIG. 7 is a block diagram of an example system, in accordance with a first exemplary use case.

Exemplary use cases of embodiments disclosed herein are now discussed. As shown in FIG. 7, for example, system 700 is shown, which may be similar to systems 100, 200, 300, 400, and 500, as discussed above. In the system 700 of FIG. 7, cloud environment 701 may include a variety of different assets, such as Asset $A_1$ 702 and Assets $A_2$ ... $A_N$ 704. In some embodiments, Asset $A_1$ 702 may be newly spun up or newly identified, and Assets $A_2$ ... $A_N$ 704 may be preexisting or previously identified. Asset $A_1$ 702 and Assets $A_2$ ... $A_N$ 704 may be running on the same physical or virtual machine, or on different physical or virtual machines. Similarly, target asset 707 may be running on the same physical or virtual machine as the other assets. Moreover, although depicted in FIG. 7 as all being in the same cloud communication environment 708, Asset $A_1$ 702, Assets $A_2$ ... $A_N$ 704, and target asset 707 may be in the same or different cloud communication environments.

As depicted in FIG. 7, in a first operation "1", a scaling manager 703 may spin up Asset $A_1$ 702. In accordance with the above embodiments, scaling manager 703 may be a cloud system application that has a function of generating new assets (e.g., automatically creating new instances of applications on demand, or creating multiple instances of the same asset in order to handle a high volume of communications). Further, scaling manager 703 may be a component of a continuous delivery or continuous deployment process, where new code is written and spun up in one or more assets (e.g., Asset $A_1$ 702). Still further, scaling manager 703 may spin up new assets based on Amazon CloudWatch Triggers,™ for example, or any other monitoring system which developers have programmed to automatically spin up new assets under certain conditions or based on certain events.

In a second operation "2", the scaling manager 703 may push an alert to a message queuing service 705 providing a notification of the new asset (e.g., Asset $A_1$ 702). An example of such a message queuing service is the Amazon Simple Queue Service (SQS)™. In other embodiments, the message queuing service 705 may monitor the cloud environment 701 or the cloud communication system environment 708 and not require an alert from scaling manager 703 to identify the new asset. For example, the message queuing service 705 may continuously or periodically monitor the cloud environment 701 for changes in new assets being spun up, new communications requests, new authentication requests, etc.

In a third operation "3", the message queuing service 705 may send a notification of the new asset to the trusted source 706. As discussed above, this notification may include information about the spun up asset that can be used to determine whether to authenticate the spun up asset. In some embodiments, the trusted source 706 may continuously or periodically poll the message queuing service 705 for notifications of newly spun up assets. In further embodiments, in response to receiving the notification from the message queuing service 705, the trusted source 706 may then begin investigating the spun up asset. As discussed above, this may involve obtaining information about the spun up asset directly from the spun up asset itself, or from a micro agent associated with the spun up asset, or from one or more other components associated with the cloud environment 701 or cloud communication system environment 708.

In this third operation, if the trusted source 706 authenticates the spun up asset (e.g., Asset $A_1$ 702), it may then determine whether to authorize the spun up asset to engage in secure communications with one or more other assets (e.g., target asset 707). As discussed above, a policy may be invoked to determine whether the spun up asset should receive a credential for use in secure communications with the other asset. The credential may be provided directly to the spun up asset, or indirectly, in accordance with the techniques discussed above. Trusted source 706 may communicate directly with Asset $A_1$ 702 or indirectly with it (e.g., through message queuing service 705).

In the use case depicted in FIG. 700, in a fourth operation "4" the credential is directly provided to the spun up asset Asset $A_1$ 702. The credential may, for example, be stored in Asset $A_1$ 702 or on the same machine that runs Asset $A_1$ 702. Using the credential provided from the trusted source 706, the Asset $A_1$ 702 is then able to engage in secure communications with the target asset 707 in a fifth operation "5".

Figure 8:
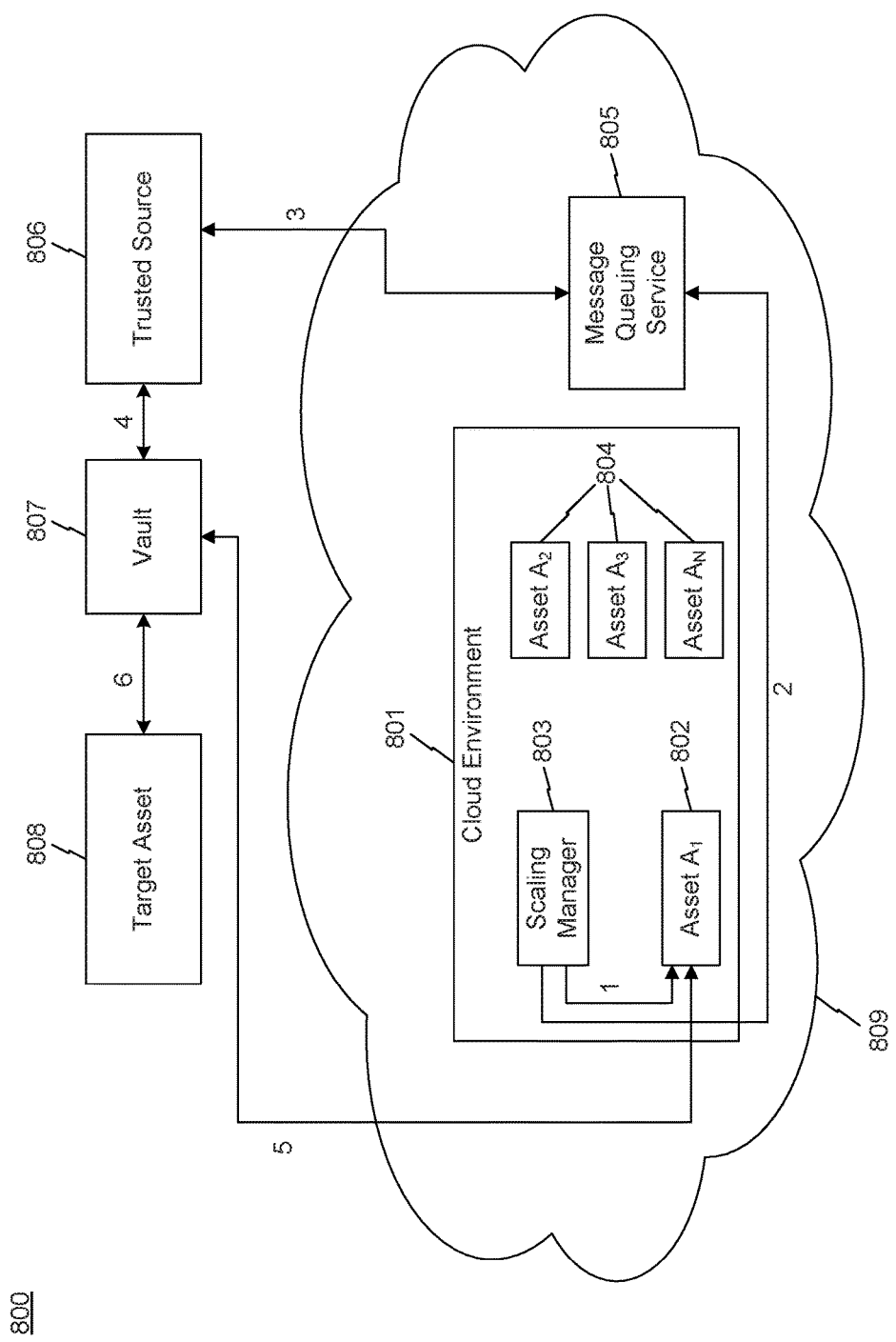
FIG. 8 is a block diagram of an example system, in accordance with a second exemplary use case.

A different use case is depicted in FIG. 8. In FIG. 8, system 800 is shown, which may be similar to system 700 as discussed above. In the system 800 of FIG. 8, cloud environment 801 may include a variety of different assets, such as Asset $A_1$ 802 and Assets $A_2$ ... $A_N$ 804, which are similar to Asset $A_1$ 702 and Assets $A_2$ ... $A_N$ 704. Cloud environment 801 may be part of a cloud communication system environment 809, similar to cloud communication environment 708. System 800 may include a scaling manager 803, which is similar to scaling manager 703. Further, system 800 may include a message queuing service 805 and trusted source 806, which are similar to message queuing service 705 and trusted source 706. System 800 may also include a target asset 808 with which Asset $A_1$ 802 seeks to engage in secure communications. Target asset 808 is similar to target asset 707. Operations "1", "2", and "3" in this example use case are substantially similar to operations "1", "2", and "3" described above with respect to FIG. 7.

System 800 differs from system 700, however, in that system 800 also includes a secure credential vault 807. In accordance with disclosed embodiments, when trusted source 806 determines that Asset $A_1$ 802 is authenticated and authorized to engage in secure communications with target asset 808, rather than send a credential directly to Asset $A_1$ 802 it may send the credential to secure credential vault 807 in a fourth operation "4". In this way, secure credential vault 807 can securely maintain the credential without having the credential stored on (or known to) Asset $A_1$ 802 or the machine running Asset $A_1$ 802. Thus, when Asset $A_1$ 802 seeks to communicate with target asset 808, it may first communicate with the secure credential vault 807 in a fifth operation "5", and the secure credential vault 807, on behalf on Asset $A_1$ will then present the credential to target asset 808 to enable the secure communications in a sixth operation "6". In such embodiments, the trusted source 806 or secure credential vault 807 may also perform the further operation of rotating, deleting, or otherwise rendering ineffective any preexisting (e.g., hardcoded) credentials associated with Asset $A_1$ 802. Trusted source 806 may communicate directly with Asset $A_1$ 802 or indirectly with it (e.g., through message queuing service 805).

Figure 9:
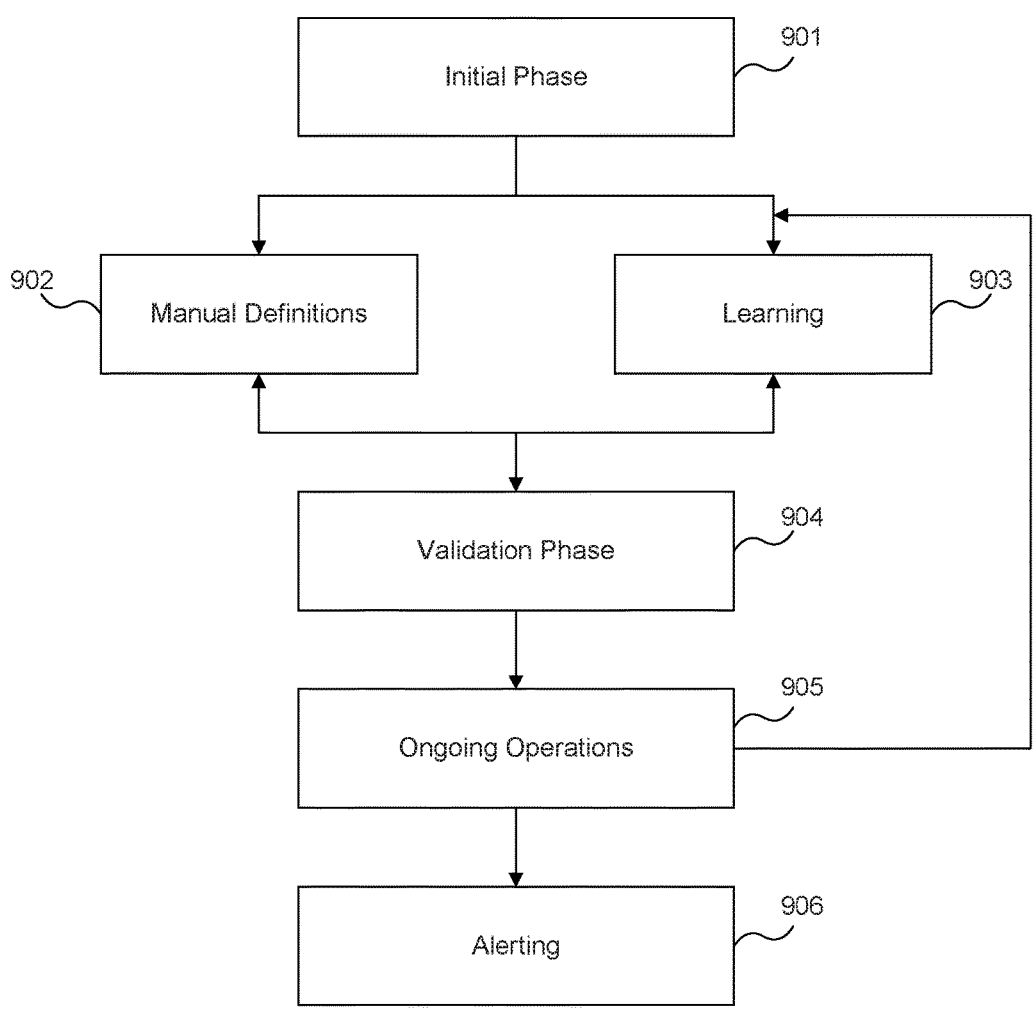
FIG. 9 is a flow chart illustrating an example method for dynamically investigating a changing asset-to-asset cloud communication environment, in accordance with disclosed embodiments.

FIG. 9 is a flow chart illustrating an example process 900 for dynamically investigating a changing asset-to-asset cloud communication environment. In accordance with above embodiments, process 900 may be practiced in the systems of FIGS. 1-5, 7, and 8. Because process 900 involves a dynamic investigation of attributes and parameters of the changing asset-to-asset cloud communication environment, it need not rely on configuration files, defined system access policies, or stored lists of access rights in order to determine whether assets can communicate with each other or target resources. Further, process 900 may be carried out wholly or partly automatically by the trusted server, and may be wholly or partly transparent to assets being investigated (e.g., without the assets being affected by the investigation or being actively involved in it).

Process 900 may be applied not only for dynamically investigating spun up assets, but also may be applied more broadly to any new trust connection that is needed in a network or other environment. For example, process 900 may apply to new versions of software or applications that are running on network resources (e.g., when a new application is installed). Process 900 may also apply to new components (e.g., patches, upgrades, fixes, etc.) that are installed on resources. Further, process 900 may apply with respect to new flows in a network or other environment (e.g., flows of communications between assets).

Process 900 may include an initial phase operation 901. In some embodiments, initial phase operation 901 may be performed the first time a trusted server (e.g., trusted source 105 in FIG. 1, trusted source 205 in FIG. 2, trusted source 304 in FIG. 3, trusted source 408 in FIG. 4, or trusted source 706 in FIG. 7) is initialized or run. In other embodiments, initial phase operation 901 may occur after a trusted server is already running, but is being reconfigured to allow for dynamic investigation capabilities. As part of initial phase operation 901, the trusted server may create a baseline trusted context, which is a set of rules or access rights based on an initial organization or mapping of specific attributes or parameters of assets in the changing asset-to-asset cloud communication environment.

In some embodiments, initial phase operation 901 may involve one or both of manual definitions operation 902 and learning operation 903. Manual definitions operation 902 may involve an operator (e.g., cloud environment administrator or security user) determining what specific attributes or parameters of assets to place in specific categories. For example, the operator may determine the normal working hours of particular users or types of users, and enter their working hours into the baseline context. Further, the operator may determine the normal IP address or MAC address of particular accounts, and enter that information into the baseline context. As another example, the operator may determine what network resources particular users or accounts are permitted to access according to their organizational responsibilities, and enter that information into the baseline context. In some embodiments, the baseline context is stored as a set of rules or access rights (e.g., in a database, table, etc.) at the trusted server. In other embodiments, the baseline context is stored separate from the trusted server, but accessible to the trusted server.

Learning operation 903 may involve the trusted server granting unlimited (or nearly unlimited) access to assets in the changing asset-to-asset cloud communication environment, and observing them and their behavior to develop the baseline context. As discussed above, this information may be collected directly by the trusted server or through agents (e.g., micro agent 504 of FIG. 5). In some embodiments, learning operation 903 may be guided. For example, an operator may guide the trusted server by specifying parameters or characteristics to observe (e.g., IP address, time of creation, time of access, target resource being accessed, etc.). The trusted server can then observe the creation and activity of assets and log information based on the specified parameters or characteristics.

In further embodiments, learning operation 903 is unguided, and the trusted server automatically observes the creation and activity of assets, and develops its own categories of parameters and characteristics. This may be accomplished based on machine learning or artificial intelligence tools that look for patterns in the creation or activity of assets. The patterns may be based on the regular behavior or communications flow of a particular asset (e.g., in an e-commerce environment, the asset typically accesses an inventory tracking asset in the cloud environment when a request for an order or purchase is received). The patterns may further be based on regular behavior or communications flow of types of assets (e.g., in a website serving environment, multiple instances of a web page are instantiated when load on a web server exceeds a threshold). Further, the patterns may be based on time information (e.g., a particular asset has a highly regular or periodic history of accessing another asset). As another example, the patterns may take into account areas of the cloud environment that are accessed (e.g., spun up assets typically communicate with other assets in a defined area the cloud environment, not assets in separate networks). In various embodiments, a system operator may further tune the baseline context to determine how strict or relaxed the baseline context is to be applied (in other words, how much deviation from the rules of the baseline context is permitted). This tuning may be specific to individual parameters or may apply collectively to all parameters.

In some embodiments, the baseline context may be stored as groupings of assets and corresponding rules or access rights for the assets. For example, the groupings of assets may indicate types or forms of assets. Such categories may be descriptive (e.g., web serving assets, database accessing assets, administrator assets, computation assets, etc.), may specify a time that certain assets were spun up (e.g., by day, hour, second, etc.), may be based on what orchestration tool or process created them (e.g., a scaling process, a load balancing process, a customized development process, etc.), or use various other categorization techniques. The corresponding access rights may be based on rules that are manually or automatically integrated into the baseline context as part of its creation and training, as discussed above. Access rights may define the abilities of individual assets, or groups of assets, to communicate with other assets or target resources. In some embodiments, access rights may have different versions (e.g., there may be different versions of the definitions of access rights, or versions of the baseline context itself). Based on such versions, it may be determined whether certain access rights are current or not, and whether to revert back to prior versions of access rights.

In some embodiments, multiple versions or types of a context may be generated and maintained. For example, one context may be designed to handle regular or expected behavior in the cloud environment as assets are created and communicate with each other, while another context may be created for special use situations. Examples of special use contexts include a system maintenance context, a troubleshooting context, a cybersecurity breach context, etc. In each of these special use cases, the creation and activity of assets in the cloud environment may differ significantly from what is expected during regular operation of the cloud environment. In some embodiments, changes to certain access rights (e.g., highly sensitive access rules) in the context may be restricted to times when the context is in maintenance mode, in order to prevent improper tampering with the context. Similarly, the context may have a new asset creation mode (e.g., when new authorized assets are created), during which at least some of the access rights may be overridden by changes from a system operator.

Further, in some embodiments a context may be developed in one environment (e.g., in operations 901-902-903) and then exported or pushed into a live environment (e.g., in operation 905). For example, a context may be developed in a test environment, where the context is run in a simulated fashion or with an error-testing application. Once the context has been developed and tested in the test environment, it can be exported or pushed into the live environment for actual use. If any modifications to the context are needed before it is deployed in the live environment, they can be performed manually (e.g., in operation 902) or automatically (e.g., in operation 903). Further, versions of a context may be created for the purpose of backup (e.g., in case a context becomes infected by malicious software or contains errors that would be difficult to fix).

In some embodiments, process 900 also includes a validation operation 904. This process may involve manual or automatic error-checking or review of the developed context. For example, operators may review the different categories of parameters and characteristics to determine if they properly align with an organization's policy. Further, validation operation 904 may involve automatically testing the context by processing simulated or test data into it. This may involve, for example, inputting predefined information about the creation and activity of assets into the context, and observing how the context operates. In some embodiments, the simulation or test data may be developed to reveal errors or inconsistencies in the context. For example, the simulation or test data may involve many permutations of a particular parameter or characteristic, and may be designed to test whether the context will treat the different permutations the same or differently. Based on the results of validation operation 904, it may be determined whether changes to the context are needed before it is deployed in a live environment. Further, in some embodiments validation operation 904 may involve testing the context by inputting into it historical data regarding the creation and activity of assets. In this way, the performance of the context can be estimated by observing how it handles previous data.

Process 900 may also involve an ongoing operations phase 905, where the context is deployed in a live environment. In ongoing operations phase 905, the context may be referenced to determine whether the creation or activity of assets complies with the context or is deemed an anomaly. As an example, an asset in the changing asset-to-asset cloud environment may typically first access a database, and second access a financial services server for batch work once every 24 hours between 11:50 pm and 11:59 pm. Because such a pattern of activity may be stored in the context, when an asset performs that pattern of activity within that time window, it may be deemed to not be an anomaly. On the other than, if the asset accessed the financial services server first, or at 4:00 pm, it may be deemed an anomaly.

As discussed above, the tolerance level of the context may be tuned to determine exactly much deviation from the context is permitted before the creation or activity of an asset is deemed an anomaly. The tolerance may be adjusted as a percentage or in absolute numbers. Further, during ongoing operations phase 905, the context may continue to be developed and improved. As assets in the cloud environment are spun up, spun down, communicate with each other, and engage in particular flows or patterns of communications, the context may be regularly updated to account for new patterns of activity. In accordance with above embodiments, the manual or automatic learning of the context may occur continuously. Accordingly, as shown in FIG. 9, process 900 may involve cycling from operation 905 back to operation 903, so that the learning process may continue and the context may be continually updated.

In some embodiments, limitations on the development of the context may be set. For example, one limitation may prevent the context from changing too rapidly. Such a limitation may be expressed as a number of changes to the context that are allowed over a specified period of time, a percentage of change relative to the entire context that are allowed to change over the period of time, etc. Further, some limitations may specify that particular attributes of the context can never change (or only upon a manual override). Examples may include manually defined parameters or characteristics in the context that were set in accordance with organizational policies (e.g., based on IP address). In addition, the amount of permitted change for parameters or characteristics can be set on an individual basis (e.g., for single parameters or characteristics) or collectively (e.g., for all parameters or characteristics). Accordingly, an operator may define the context so that a particular parameter (e.g., IP address) has a very small or no tolerance, while another parameter (e.g., hour of day) can have a greater tolerance.

Process 900 may also involve alerting operations 906. When the context is compared to the creation and activity of assets in the cloud environment, and anomalies are determined to occur, alerts about suspicious activity may be generated. Such alerts may be generated by the trusted server or by another resource in communication with the trusted server. The alerts may be communicated as messages (e.g., emails, SMS messages, HTTP pages, etc.), as graphical user interface prompts, as entries in a log, or in various other formats. In some embodiments, when alerts are received, system operators are presented with the alert and information about how it arose (e.g., what the activity of the asset was, what parameter or characteristic of the context it was processed against, and why it was deemed an anomaly). In such embodiments, the system operator may be given the option to adjust the context to reject or allow such activity in the future. For example, if the creation of an asset is deemed an anomaly because it was created during non-work hours, the system operator may nonetheless approve the creation if it occurred during a time of approved overtime in the organization. Accordingly, the context may also be updated to reflect the creation of assets during the approved overtime. Similarly, system operators may regularly monitor the performance of the context and make adjustments to it as deemed appropriate.

Figure 10:
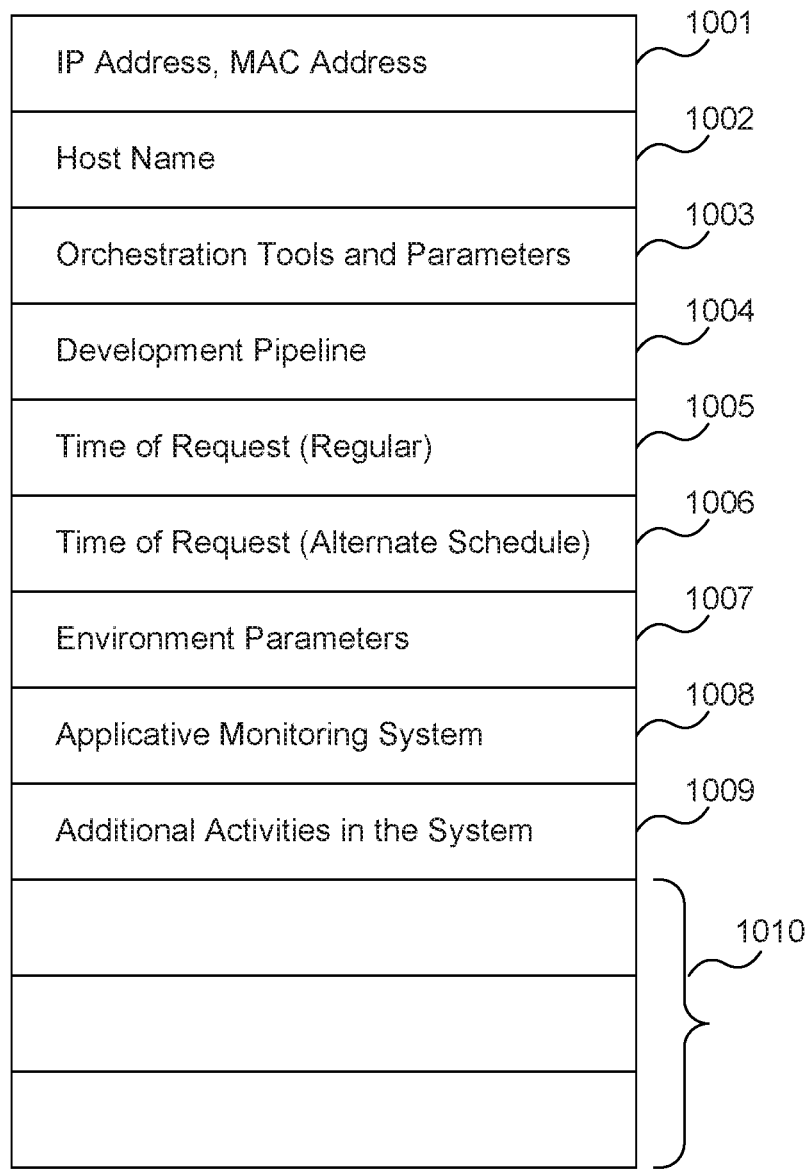
FIG. 10 is an exemplary data structure illustrating examples of types of information that a trusted resource may use in dynamically investigating a changing asset-to-asset cloud communication environment, in accordance with disclosed embodiments.

FIG. 10 is an exemplary data structure 1000 illustrating examples of types of information that a trusted server may use in dynamically investigating a changing asset-to-asset cloud communication environment. For example, data structure 1000 may include stored information regarding the IP address or MAC address 1001 of assets or target resources. Further, data structure 1000 may include stored information regarding the host name 1002 of assets or target resources. Data structure 1000 may also include stored information regarding orchestration tools and parameters 1003 that are associated with the creation of assets or target resources. For example, such information may specify what particular orchestration tool (e.g., Amazon Web Services CloudFormation™, Cisco CloudCenter™, IBM Cloud Orchestrator™, Microsoft Azure Automation™, etc.) was used to spin up the asset, and what parameters the tool used to spin it up. Such parameters may include, for example, an asset ID, a communications credential, a version, a defined lifespan, hardcoded data or instructions, etc. Data structure 1000 may also include stored information on the development pipeline 1004 associated with an asset (e.g., a machine-consumable remote access API). Data structure 1000 may further include stored information regarding the time of a request during regular operations 1005 or according to an alternate schedule 1006 (e.g., weekend schedule, holiday schedule, overtime schedule, etc.). Further, data structure 1000 may include environment parameters 1007. Such parameters may indicate the load of the cloud environment (e.g., volume of activity), load in other parts of a network environment, and various other information about the environment (e.g., as available from Amazon Web Services Cloudwatch™, or similar tools). Data structure 1000 may further include information about applicative monitoring systems 1008. Such systems (e.g., ELK or Prometheus) may be specific to individual assets or categories of assets. Further, the parameters may include or be based on additional activities in the system 1009. For example, the additional activities parameter 1009 may reflect other credential requests that a trusted server has received or responded to, or patterns of activity. As an example, the additional activities may indicate that a particular web development process requires a client to access a particular web development server, or that a particular software development process involves a development application accessing a deployment server. Such information and patterns may be stored in data structure 1000 as additional activities parameters 1009.

Various additional information 1010 may be stored in data structure 1000 as well. Further, for each parameter (e.g., 1001-1010), variations may be stored that pertain to exceptional circumstances (e.g., system maintenance, troubleshooting, cyber-attack, etc.). As an example, the host name parameter 1002 may have an alternate value corresponding to a host that operates during a maintenance mode. Similarly, the development pipeline parameter 1004 may have an alternate value that pertains during a cyber-attack situation, where no development activities are allowed to reach production. As discussed above, data structure 1000 may be stored in the trusted server or may be stored separately and accessible to the trusted server.

Figure 11:
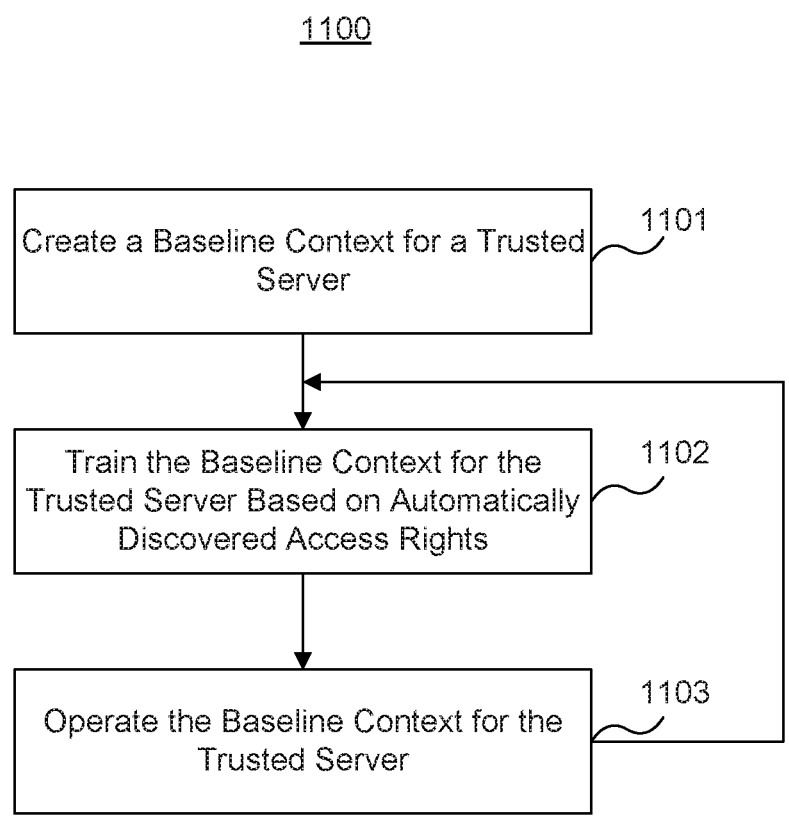
FIG. 11 is a flow chart illustrating an example method for creating, training, and operating a baseline context, in accordance with disclosed embodiments.

FIG. 11 is a flow chart illustrating an example process 1100 for creating, training, and operating a baseline context. In accordance with above embodiments, process 1100 may be implemented in the systems of FIGS. 1-5, 7, and 8.

Process 1100 may include an operation 1101 of creating a baseline context for a trusted server. As discussed above, the trusted server may be trusted source 105 in FIG. 1, trusted source 205 in FIG. 2, trusted source 304 in FIG. 3, trusted source 408 in FIG. 4, or trusted source 706 in FIG. 7. The baseline context may include one or more categories of assets in the changing asset-to-asset cloud communication environment and a corresponding one or more access rights for the plurality of categories of assets. For example, the categories of assets may indicate types or forms of assets. Such categories may be descriptive (e.g., web serving assets, database accessing assets, administrator assets, computation assets, etc.), may specify a time that certain assets were spun up (e.g., by day, hour, second, etc.), may be based on what orchestration tool or process created them (e.g., a scaling process, a load balancing process, a customized development process, etc.), or use various other categorization techniques. The corresponding access rights may be specific to each asset in a category or may be specific to each category. As discussed above, access rights may define what types of access rights assets have to communicate with other network resources (e.g., target resources in the cloud environment). In some embodiments, operation 1201 may correspond to the initial phase 901 of process 900, as described above in connection with FIG. 9.

Process 1100 may also include an operation 1102 of training the baseline context for the trusted server based on automatically discovered access rights. With reference to process 900 in FIG. 9, for example, the training may occur as part of operations 902 or 903, where the baseline context is manually or automatically refined in a learning process. As discussed above, the automatically discovered access rights may be dynamically discovered through the learning process, and may be stored in the baseline context for later access. The training may involve adding rules to the baseline context based on observing activity of the assets. Various techniques for observing the activity of the assets and storing derived rules are possible, as discussed above.

Further, process 1100 may include an operation 1103 of operating the trained baseline context. In accordance with process 900 of FIG. 9, this may correspond to ongoing operations 905. As discussed above, while the trained baseline context is operating (e.g., in a live environment), it may be referenced to determine whether the creation or activity of assets constitutes an anomaly. Further, the trained baseline context may operate and simultaneously further train itself. As discussed above, this may involve manual revisions to the baseline context by an operator, or automatic observations of asset activity and corresponding updates to the baseline context. In accordance with some embodiments, operation 1103 includes the further operations of process 1200, which are described below in connection with FIG. 12.

Figure 12:
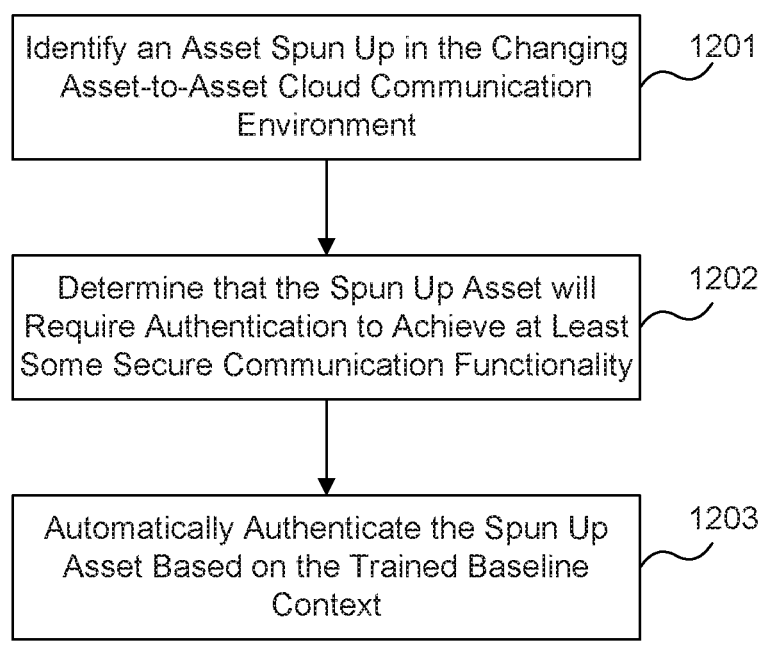
FIG. 12 is a flow chart illustrating an example method for automatically authenticating spun up assets or processes in a changing asset-to-asset cloud communication environment, in accordance with disclosed embodiments.

FIG. 12 is a flow chart illustrating an example process 1200 for automatically authenticating spun up assets or communications flows in a changing asset-to-asset cloud communication environment, in accordance with disclosed embodiments. In accordance with above embodiments, process 1200 may be implemented in the systems of FIGS. 1-5, 7, and 8. Further, process 1200 may be performed as part of operation 1103 in process 1100 of FIG. 11.

Process 1200 may include an operation 1201 of identifying an asset spun up in the changing asset-to-asset cloud communication environment, or a new process flow involving an asset, based on a notification identifying the spun up asset or flow. This may involve an operation similar to operation 601 of process 600, as described above in connection with FIG. 6. In accordance with above embodiments, the notification may be received in a variety of ways. For example, the notification may be received by the trusted server (e.g., trusted sources 105, 205, 304, 406, 407, or 408), for example through an investigation process conducted by the trusted server. The notification may be received from the spun up asset itself or through an intermediary (e.g., a micro agent, such as micro agent 504). Further, the notification may be received by a computer device separate from a trusted server, but which is arranged for communications with the trusted server. For example, a service configured to monitor changes in a cloud environment (e.g., Amazon CloudWatch Events™) or a cloud environment provider (e.g., Amazon Web Services™) may generate the notification.

Process 1200 may further include an operation 1202 of determining that the spun up asset or flow will require authentication to achieve at least some secure communication functionality in the changing asset-to-asset cloud communication environment. This may involve an operation similar to operation 602 of process 600, as described above in connection with FIG. 6. In accordance with above embodiments, this may involve cloud environment rules that all asset-to-asset communications require authorization. In such environments, all newly spun up assets may be determined to require authorization to engage in communications with other assets. Further, a determination may be made whether a specific asset with which a newly spun up asset wishes to communicate has an authorization requirement. Similarly, a new version of software on an asset or a new communications flow of an asset may be determined to require authorization in order to occur. The determination may also be made in various other ways, as discussed above.

Process 1200 may also include an operation 1203 of automatically authenticating the spun up asset based on the trained baseline context for the trusted server. This may involve an operation similar to operation 603 of process 600, as described above in connection with FIG. 6. In accordance with above embodiments, the authentication may take several forms, such as verification of passwords, SSH keys, symmetric (e.g., public/private) keys, Kerberos tickets, Docker signed tags, and other types of cryptographic data or privileged access tokens. Further, the authentication may be based on information associated with a user identity, such as biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor.

Figure 13:
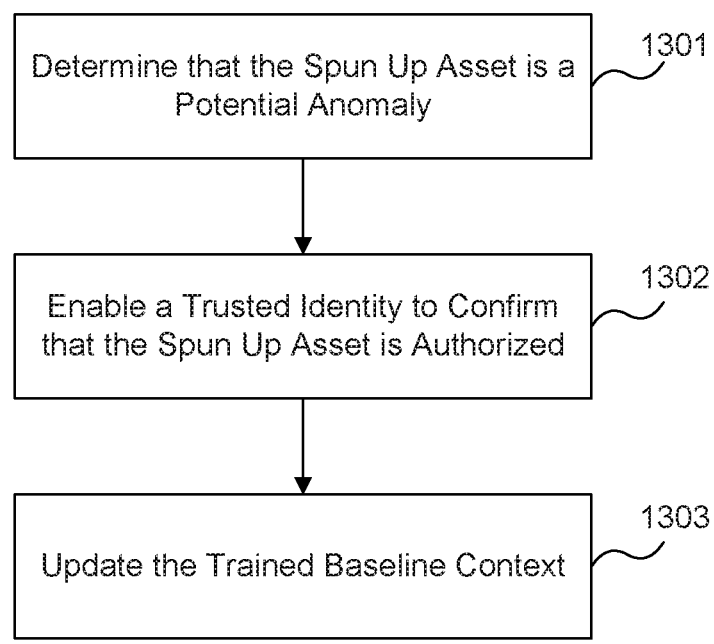
FIG. 13 is a flow chart illustrating an example method for updating a trained baseline context, in accordance with disclosed embodiments.

FIG. 13 is a flow chart illustrating an example process 1300 for updating a trained baseline context, in accordance with disclosed embodiments. In accordance with above embodiments, process 1300 may be implemented in the systems of FIGS. 1-5, 7, and 8. Further, process 1300 may be implemented as part of the ongoing operations phase 905 of process 900, as described above in connection with FIG. 9.

Process 1300 may include an operation 1301 of determining that a spun up asset or communications flow is a potential anomaly according to the trained baseline context. As discussed above, this may involve comparing the creation or activity of the asset to the trained baseline context, and determining whether (and to what extent) it deviates from the trained baseline context. Depending on the tolerance that has been set for the baseline context (e.g., for individual parameters, or for all parameters), the degree of deviation from the baseline context may dictate that the creation or activity of the asset either is, or is not, an anomaly. Further, some deviations may be anomalies under any tolerance setting, and some activity may not be an anomaly under any tolerance setting. This depends on the specific rules that have been stored in the context.

Process 1300 may also include an operation 1302 of enabling a trusted identity to confirm that the spun up asset or communications flow is authorized to perform the secure communication functionality in the changing asset-to-asset cloud communication environment. In some embodiments, this may be similar to operation 604 of process 600, as described above in connection with FIG. 6. The trusted identity may be an administrator, system operator, or other elevated-rights user with the ability to review and act on potential anomalies. For example, the trusted identity may be able to confirm whether the asset is authorized to perform the secure communication functionality or whether the communications flow is authorized. In accordance with above embodiments, the trusted identity may be presented with an alert (e.g., message or GUI prompt), which may include information about the creation or activity of the asset and information about why it deviated from the trained baseline context. Based on such information, the trusted identity can determine whether or not the spun up asset is authorized to perform the secure communication functionality. For example, the trusted identity can either approve or reverse the potential anomaly. In doing so, the trusted identity may optionally choose to provide additional details or reasons about why the potential anomaly is being approved or reversed.

Process 1300 may also include an operation 1303 of updating the trained baseline context based on a confirmation from the trusted identity that the spun up asset is authorized to perform the secure communication functionality or the communications flow is authorized. In accordance with operation 905 of process 900, as described above in connection with FIG. 9, this may involve refining or updating the trained baseline context to account for the trusted identity's decision. For example, if previously the trained baseline context was configured to store rules that would have deemed specific activity of an asset anomalous, the trained baseline context can be further trained so that such rules are updated. In some embodiments, this may involve replacing an existing rule with a new rule based on the trusted identity's determination. In further embodiments, it may involve revising a rule or creating an exception to a rule in accordance with the specific activity conducted by the asset.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant cloud communication environments, secure communication functionality, assets, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically investigating a changing asset-to-asset cloud communication environment, the operations comprising:
   create a baseline context for a trusted server, the baseline context including a plurality of categories of assets in the changing asset-to-asset cloud communication environment and a corresponding plurality of access rights for the plurality of categories of assets;
   train the baseline context for the trusted server based on automatically discovered access rights, wherein the automatically discovered access rights are dynamically discovered, and the training includes adding rules to the baseline context based on observing activity of a plurality of assets corresponding to the plurality of categories of assets; and
   operate the trained baseline context for the trusted server to:
      identify an asset spun up in the changing asset-to-asset cloud communication environment based on a notification identifying the spun up asset;
      determine that the spun up asset will require authentication to achieve at least some secure communication functionality in the changing asset-to-asset cloud communication environment; and
      automatically authenticate the spun up asset based on the trained baseline context for the trusted server.

2. The non-transitory computer readable medium of claim 1, wherein the operations further comprise automatically determine, based on the authentication, whether the spun up asset is authorized to perform the secure communication functionality in the changing asset-to-asset cloud communication environment.

3. The non-transitory computer readable medium of claim 1, wherein the operations further comprise determining a version of the automatically discovered access rights and confirming whether it is the most recent version.

4. The non-transitory computer readable medium of claim 1, wherein the trusted server and spun up asset are in a common system environment within the changing asset-to-asset cloud communication environment.

5. The non-transitory computer readable medium of claim 1, wherein the trusted server and spun up asset are in different system environments within the changing asset-to-asset cloud communication environment.

6. The non-transitory computer readable medium of claim 1, wherein the trained baseline context for the trusted server includes a first rule that a first one of the access rights may not be changed and second rule that a second one of the access rights may be changed within a defined threshold of variance.

7. The non-transitory computer readable medium of claim 1, wherein the operations further comprise:
   determine that the spun up asset is a potential anomaly according to the trained baseline context;
   enable a trusted identity to confirm that the spun up asset is authorized to perform the secure communication functionality in the changing asset-to-asset cloud communication environment; and
   update the trained baseline context based on a confirmation from the trusted identity that the spun up asset is authorized to perform the secure communication functionality.

8. The non-transitory computer readable medium of claim 7, wherein the trusted identity is provided with a prompt identifying the spun up asset being a potential anomaly according to the trained baseline context.

9. The non-transitory computer readable medium of claim 1, wherein the trained baseline context is created in a manner transparent to the spun up asset.

10. The non-transitory computer readable medium of claim 1, wherein the automatically discovered access rights are further discovered based on information identifying a cloud orchestration tool that created the spun up asset.

11. The non-transitory computer readable medium of claim 1, wherein the automatically discovered access rights are further discovered based on the workflow process by which the spun up asset was created.

12. The non-transitory computer readable medium of claim 1, wherein the automatically discovered access rights are further discovered based on time information associated with the creation of the spun up asset.

13. The non-transitory computer readable medium of claim 1, wherein the automatically discovered access rights are further discovered based on a dynamically determined load level of a portion of the changing asset-to-asset cloud communication environment.

14. The non-transitory computer readable medium of claim 1, wherein the automatically discovered access rights are further discovered based on observing patterns of communications activity among different assets in the changing asset-to-asset cloud communication environment.

15. A computer-implemented method for dynamically investigating a changing asset-to-asset cloud communication environment, the method comprising:
creating a baseline context for a trusted server, the baseline context including a plurality of categories of assets in the changing asset-to-asset cloud communication environment and a corresponding plurality of access rights for the plurality of categories of assets;
training the baseline context for the trusted server based on automatically discovered access rights, wherein the automatically discovered access rights are dynamically discovered, and the training includes adding rules to the baseline context based on observing activity of a plurality of assets corresponding to the plurality of categories of assets; and
operating the trained baseline context for the trusted server to perform steps of:
identifying an asset spun up in the changing asset-to-asset cloud communication environment based on a notification identifying the spun up asset;
determining that the spun up asset will require authentication to achieve at least some secure communication functionality in the changing asset-to-asset cloud communication environment;
automatically authenticating the spun up asset based on the trained baseline context for the trusted server; and
automatically determining, based on the authentication, whether the spun up asset is authorized to perform the secure communication functionality in the changing asset-to-asset cloud communication environment.

16. The computer-implemented method of claim 15, wherein the trained baseline context for the trusted server is configured to have a maintenance mode, during which at least some of the manually defined access rights and automatically discovered access rights are overridden by changes to access rights.

17. The computer-implemented method of claim 15, wherein the trained baseline context for the trusted server is configured to have a new asset creation mode, during which at least some of the manually defined access rights and automatically discovered access rights are overridden by changes to access rights.

18. The computer-implemented method of claim 15, further comprising providing a credential to the spun up asset for use in performing the secure communication functionality in the changing asset-to-asset cloud communication environment.

19. The computer-implemented method of claim 15, further comprising generating a credential that is not provided to the spun up asset, but is used on behalf of the spun up asset, in performing the secure communication functionality in the changing asset-to-asset cloud communication environment.

20. The computer-implemented method of claim 15, wherein the observed communications activity of the plurality of assets corresponding to the plurality of categories of assets is obtained from micro agents running on the plurality of assets.

21. The computer-implemented method of claim 20, wherein the micro agents run transparently to users of the plurality of assets.

22. The computer-implemented method of claim 20, wherein the micro agents run transparently to operating systems of the plurality of assets.

23. The computer-implemented method of claim 20, wherein the micro agents are configured to report ongoing communications activity of the plurality of assets to the trusted server.

24. The computer-implemented method of claim 20, wherein the micro agents are injected into the plurality of assets as part of a process by which the plurality of assets were spun up.

* * * * *